(12) United States Patent
Hino et al.

(10) Patent No.: US 8,614,831 B2
(45) Date of Patent: Dec. 24, 2013

(54) ACTUATOR AND OPTICAL SCANNER

(75) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 76 days.

(21) Appl. No.: 13/439,239

(22) Filed: Apr. 4, 2012

(65) Prior Publication Data

US 2012/0257261 A1 Oct. 11, 2012

(30) Foreign Application Priority Data

Apr. 6, 2011 (JP) .................................. 2011-084841

(51) Int. Cl.
*H04N 1/04* (2006.01)

(52) U.S. Cl.
USPC ........... 358/3.08; 358/474; 358/475; 358/498

(58) Field of Classification Search
USPC .......................... 358/3.08, 474, 475, 498, 497
See application file for complete search history.

(56) References Cited

U.S. PATENT DOCUMENTS

| | | | |
|---|---|---|---|
| 7,926,369 B2 * | 4/2011 | Yoda .............................. | 74/1 SS |
| 2005/0179951 A1 * | 8/2005 | Urakawa ...................... | 358/3.08 |
| 2009/0161189 A1 | 6/2009 | Noguchi et al. | |
| 2009/0231653 A1 | 9/2009 | Nakamura et al. | |
| 2011/0102870 A1 | 5/2011 | Nakamura et al. | |

FOREIGN PATENT DOCUMENTS

| | | |
|---|---|---|
| JP | 2009-069675 | 4/2009 |
| JP | 2009-148847 | 7/2009 |
| JP | 2010-079243 | 4/2010 |
| JP | 2011-107675 | 6/2011 |
| JP | 2011-170370 | 9/2011 |

\* cited by examiner

*Primary Examiner* — Houshang Safaipour
(74) *Attorney, Agent, or Firm* — Harness, Dickey & Pierce, P.L.C.

(57) ABSTRACT

An actuator includes a movable portion which can swing around a swing axis, a connecting portion which extends from the movable portion, and a support portion which supports the connecting portion, wherein the movable portion is formed in a cross shape which includes a pair of first protrusions protruding along a direction perpendicular to the swing axis and a pair of second protrusions protruding along a direction parallel to the swing axis, and when a length of the movable portion in the direction perpendicular to the swing axis is A, a length of the movable portion in the direction parallel to the swing axis is B, a length of the first protrusion in the direction perpendicular to the swing axis is a, and a length of the second protrusion in the direction parallel to the swing axis is b, the following equations (A) and (B) are satisfied.

$$0.8 \times \left\{\frac{1}{2}\left(A - \sqrt{\frac{1}{\frac{3}{A^2} + \frac{1}{B^2}}}\right)\right\} \leq a \leq 20 \times \left\{\frac{1}{2}\left(A - \sqrt{\frac{1}{\frac{1}{3A^2} + \frac{1}{B^2}}}\right)\right\} \quad (A)$$

$$0.8 \times \left\{\frac{1}{2}\left(B - \sqrt{\frac{1}{\frac{1}{3A^2} + \frac{1}{B^2}}}\right)\right\} \leq b \leq 2.0 \times \left\{\frac{1}{2}\left(B - \sqrt{\frac{1}{\frac{3}{A^2} + \frac{1}{B^2}}}\right)\right\} \quad (B)$$

19 Claims, 15 Drawing Sheets

ACTUATOR AND OPTICAL SCANNER

BACKGROUND

1. Technical Field

The present invention relates to an actuator and an optical scanner.

2. Related Art

As actuators, an actuator which uses a torsional vibrator is suggested (for example, refer to JP-A-2010-79243).

For example, in JP-A-2010-79243, an optical deflector is disclosed which includes a movable plate (movable portion), a support frame (support portion), and a pair of elastic support portions (connecting portion) which torsionally and rotatably (swingably) supports the movable plate with respect to the support frame and in which each elastic support portion is configured of two rods (beam member).

The movable plate, the support frame, and the pair of elastic support portions are integrally formed by anisotropically etching a silicon substrate in which the principal surface is configured of a (100) plane of silicon.

Moreover, in the optical deflector according to JP-A-2010-79243, the movable plate is octagonal in plan view. In the movable plate having the shape in plan view, a weight of the movable plate at a position separated from a rotation (swing) axis is smaller, and there is an advantage in that a moment of inertia is decreased.

However, when the movable plate in which the shape in plan view is octagonal is manufactured by using the anisotropic etching described above, variation in the shape is increased due to a relationship with the crystal plane.

SUMMARY

An advantage of some aspects of the invention is to provide an actuator and an optical scanner capable of decreasing a moment of inertia when a movable portion is rotated by further decreasing a variation in shape of the movable portion in the manufacture compared with the related art.

An aspect of the invention is directed to an actuator including a movable portion which can swing around a swing axis, a connecting portion which extends from the movable portion and is torsionally deformed according to the swing of the movable portion, and a support portion which supports the connecting portion, wherein the movable portion is formed in a cross shape which includes a pair of first protrusions protruding to both sides of the movable portion along a direction perpendicular to the swing axis and a pair of second protrusions protruding to both sides of the movable portion along a direction parallel to the swing axis in plan view in a thickness direction of the movable portion, and when a length of the movable portion in the direction perpendicular to the swing axis is A, a length of the movable portion in the direction parallel to the swing axis is B, a length of the first protrusion in the direction perpendicular to the swing axis is a, and a length of the second protrusion in the direction parallel to the swing axis is b, the following equations (A) and (B) are satisfied.

$$0.8 \times \left\{ \frac{1}{2}\left(A - \sqrt{\frac{1}{\frac{3}{A^2} + \frac{1}{B^2}}}\right) \right\} \leq a \leq 20 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \leq b \leq 2.0 \times \left\{ \frac{1}{2}\left(B - \sqrt{\frac{1}{\frac{3}{A^2} + \frac{1}{B^2}}}\right) \right\} \quad (B)$$

According to the actuator of the aspect of the invention, variation in shape of the movable portion in the manufacture is decreased, and it is possible to decrease a moment of inertia at the time of the swing of the movable portion.

In the actuator of the aspect of the invention, it is preferred that the movable portion satisfies a relationship of a≤b. Thereby, it is possible to effectively decrease a moment of inertia at the time of the swing of the movable portion.

In the actuator of the aspect of the invention, it is preferred that the following equations (C) and (D) are satisfied.

$$0.9 \times \left\{ \frac{1}{2}\left(A - \sqrt{\frac{1}{\frac{3}{A^2} + \frac{1}{B^2}}}\right) \right\} \leq a \leq 1.6 \times \left\{ \frac{1}{2}\left(A - \sqrt{\frac{1}{\frac{1}{3A^2} + \frac{1}{B^2}}}\right) \right\} \quad (C)$$

$$0.9 \times \left\{ \frac{1}{2}\left(B - \sqrt{\frac{1}{\frac{1}{3A^2} + \frac{1}{B^2}}}\right) \right\} \leq b \leq 1.6 \times \left\{ \frac{1}{2}\left(B - \sqrt{\frac{1}{\frac{3}{A^2} + \frac{1}{B^2}}}\right) \right\} \quad (D)$$

Thereby, it is possible to effectively decrease a moment of inertia at the time of the swing of the movable portion while securing a light reflection area of the movable portion.

In the actuator of the aspect of the invention, it is preferred that an outer shape of the movable portion in plan view is mainly configured of a line parallel to the swing axis of the movable portion and a line perpendicular to the swing axis of the movable portion.

Thereby, variation in shape of the movable portion in the manufacture is decreased.

In the actuator of the aspect of the invention, it is preferred that the movable portion, the support portion, and the connecting portion are formed by anisotropically etching a silicon substrate.

Thereby, the variation in shape is decreased, and the movable portion, the support portion, and the connecting portion can be easily formed.

In the actuator of the aspect of the invention, it is preferred that a plate surface of the movable portion is configured of a (100) plane of silicon.

Thereby, by anisotropically etching the silicon substrate in which the plate surface is configured of the (100) plane, the variation in shape is decreased, and the movable portion, the support portion, and the connecting portion can be easily formed.

In the actuator of the aspect of the invention, it is preferred that side surfaces of the movable portion are mainly configured of a (111) plane of silicon.

Thereby, the (111) plane of silicon is used as a stop layer of etching by anisotropically etching the silicon substrate in which the plate surface is configured of the (100) plane, the variation in shape is decreased, and the movable portion, the support portion, and the connecting portion can be easily formed.

In the actuator of the aspect of the invention, it is preferred that a groove having a V shape in a cross-section perpendicular to the plate surface of the movable portion is formed in the side surfaces of the movable portion.

Thereby, it is possible to decrease the moment of inertia of the movable portion. In addition, in the groove, the (111) plane of silicon is used as a stop layer of etching by anisotropically etching the silicon substrate in which the plate surface is configured of the (100) plane, the variation in shape is decreased, and the movable portion can be easily formed.

In the actuator of the aspect of the invention, it is preferred that a surface of the connecting portion is configured of the (100) plane and the (111) plane of silicon.

Thereby, the (111) plane of silicon is used as the stop layer of etching, the variation in shape is decreased, and the connecting portion can be easily formed.

Another aspect of the invention is directed to an actuator including a movable portion which can swing around a swing axis, a connecting portion which extends from the movable portion and is torsionally deformed according to the swing of the movable portion, and a support portion which supports the connecting portion, wherein the movable portion is formed in a shape in which each of four corner-portions of a quadrangle including a pair of sides along the swing axis and a pair of sides along a direction perpendicular to the swing axis is removed in a quadrilateral shape in plan view in a thickness direction of the movable portion, and when a length of the movable portion in the direction perpendicular to the swing axis is A, a length of the movable portion in the direction parallel to the swing axis is B, a length of four corner-portions of the movable portion in a direction perpendicular to the swing axis is a, and a length of four corner-portions of the movable portion in a direction parallel to the swing axis is b, the following equations (A) and (B) are satisfied.

$$0.8 \times \left\{ \frac{1}{2}\left(A - \sqrt{\frac{1}{\frac{3}{A^2} + \frac{1}{B^2}}}\right) \right\} \leq a \leq 2.0 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \leq b \leq 2.0 \times \left\{ \frac{1}{2}\left(B - \sqrt{\frac{1}{\frac{3}{A^2} + \frac{1}{B^2}}}\right) \right\} \quad (B)$$

According to the actuator of the aspect of the invention, variation in shape of the movable portion in the manufacture is decreased, and it is possible to decrease a moment of inertia at the time of the swing of the movable portion.

Still another aspect of the invention is directed to an optical scanner including a movable portion which includes a light reflecting portion having light reflectivity and can swing around a swing axis, a connecting portion which extends from the movable portion and is torsionally deformed according to the swing of the movable portion, and a support portion which supports the connecting portion, wherein the movable portion is formed in a cross shape which includes a pair of first protrusions protruding to both sides of the movable portion along a direction perpendicular to the swing axis and a pair of second protrusions protruding to both sides of the movable portion along a direction parallel to the swing axis in plan view in a thickness direction of the movable portion, and when a length of the movable portion in the direction perpendicular to the swing axis is A, a length of the movable portion in the direction parallel to the swing axis is B, a length of the first protrusion in the direction perpendicular to the swing axis is a, and a length of the second protrusion in the direction parallel to the swing axis is b, the following equations (A) and (B) are satisfied.

$$0.8 \times \left\{ \frac{1}{2}\left(A - \sqrt{\frac{1}{\frac{3}{A^2} + \frac{1}{B^2}}}\right) \right\} \leq a \leq 2.0 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \leq b \leq 2.0 \times \left\{ \frac{1}{2}\left(B - \sqrt{\frac{1}{\frac{3}{A^2} + \frac{1}{B^2}}}\right) \right\} \quad (B)$$

According to the optical scanner configured above, variation in shape of the movable portion in the manufacture is decreased, and it is possible to decrease a moment of inertia at the time of the swing of the movable portion.

Yet another aspect of the invention is directed to an image forming apparatus including a light source which emits light, and an optical scanner which scans the light from the light source, wherein the optical scanner includes, a movable portion which includes a light reflecting portion having light reflectivity and can swing around a swing axis, a connecting portion which extends from the movable portion and is torsionally deformed according to the swing of the movable portion, and a support portion which supports the connecting portion, the movable portion is formed in a cross shape which includes a pair of first protrusions protruding to both sides of the movable portion along a direction perpendicular to the swing axis and a pair of second protrusions protruding to both sides of the movable portion along a direction parallel to the swing axis in plan view in a thickness direction of the movable portion, and when a length of the movable portion in the direction perpendicular to the swing axis is A, a length of the movable portion in the direction parallel to the swing axis is B, a length of the first protrusion in the direction perpendicular to the swing axis is a, and a length of the second protrusion in the direction parallel to the swing axis is b, the following equations (A) and (B) are satisfied.

$$0.8 \times \left\{ \frac{1}{2}\left(A - \sqrt{\frac{1}{\frac{3}{A^2} + \frac{1}{B^2}}}\right) \right\} \leq a \leq 2.0 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \leq b \leq 2.0 \times \left\{ \frac{1}{2}\left(B - \sqrt{\frac{1}{\frac{3}{A^2} + \frac{1}{B^2}}}\right) \right\} \quad (B)$$

According to the image forming apparatus configured above, variation in shape of the movable portion in the manufacture is decreased, and it is possible to decrease a moment of inertia at the time of the swing of the movable portion. Therefore, a high quality image can be inexpensively obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, proper embodiments of an actuator, an optical scanner, and an image forming apparatus of the invention will be described with reference to the accompanying drawings. In addition, in the present embodiment, a case where the actuator of the invention is applied to the optical scanner is described as an example.

First Embodiment

First, a first embodiment of the optical scanner of the invention is described.

Figure 1:
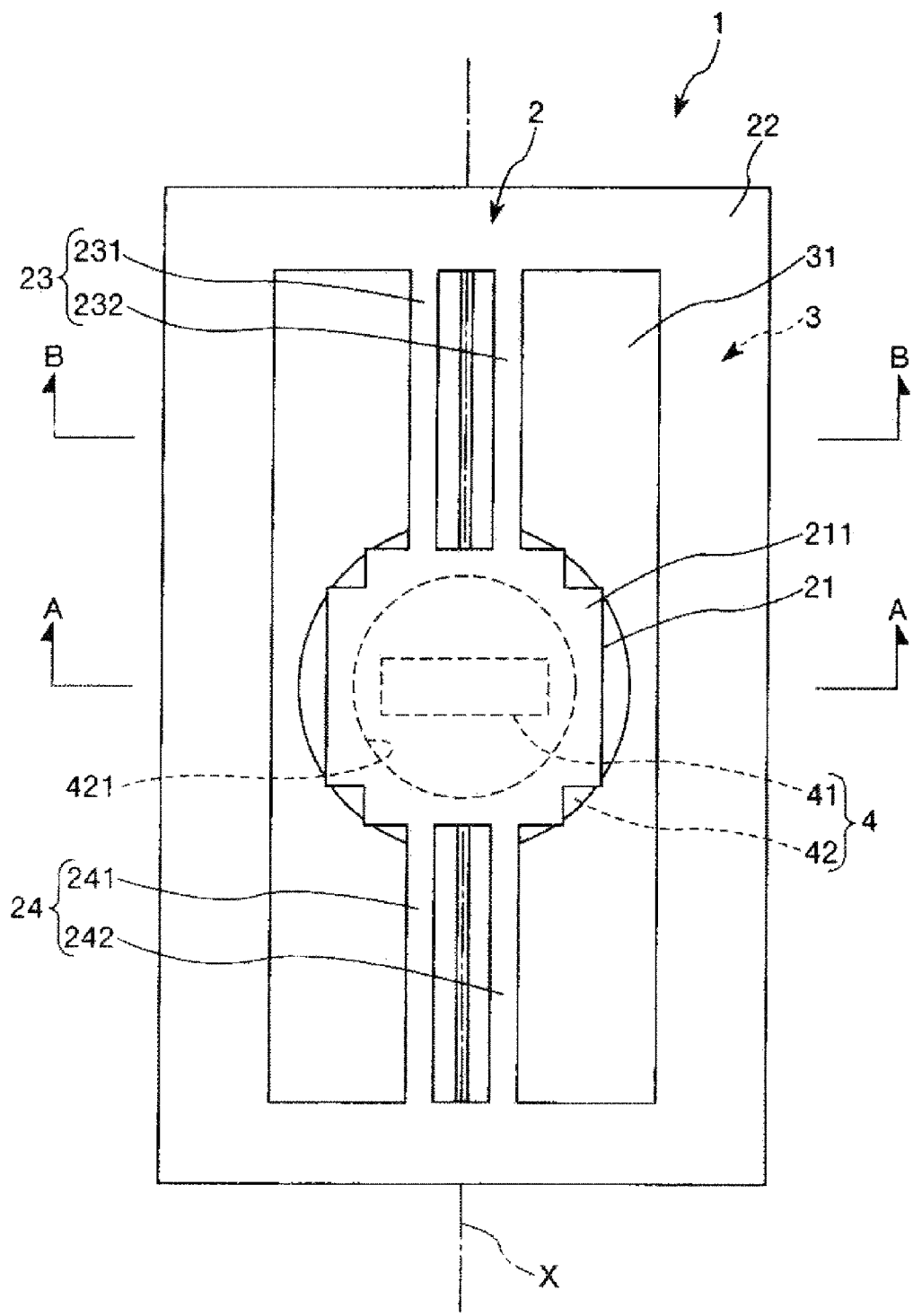
FIG. 1 is a plan view showing an optical scanner (actuator) according to a first embodiment of the invention.
Figure 2:
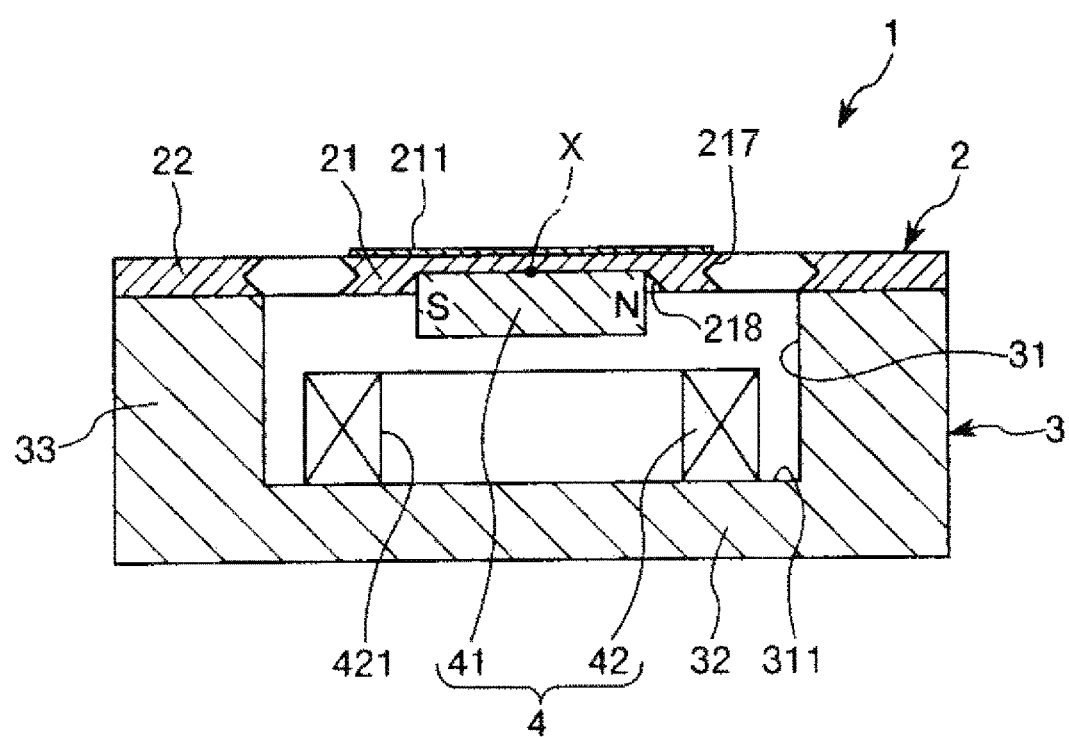
FIG. 2 is a cross-sectional view taken along a line A-A of FIG. 1.
Figure 3:
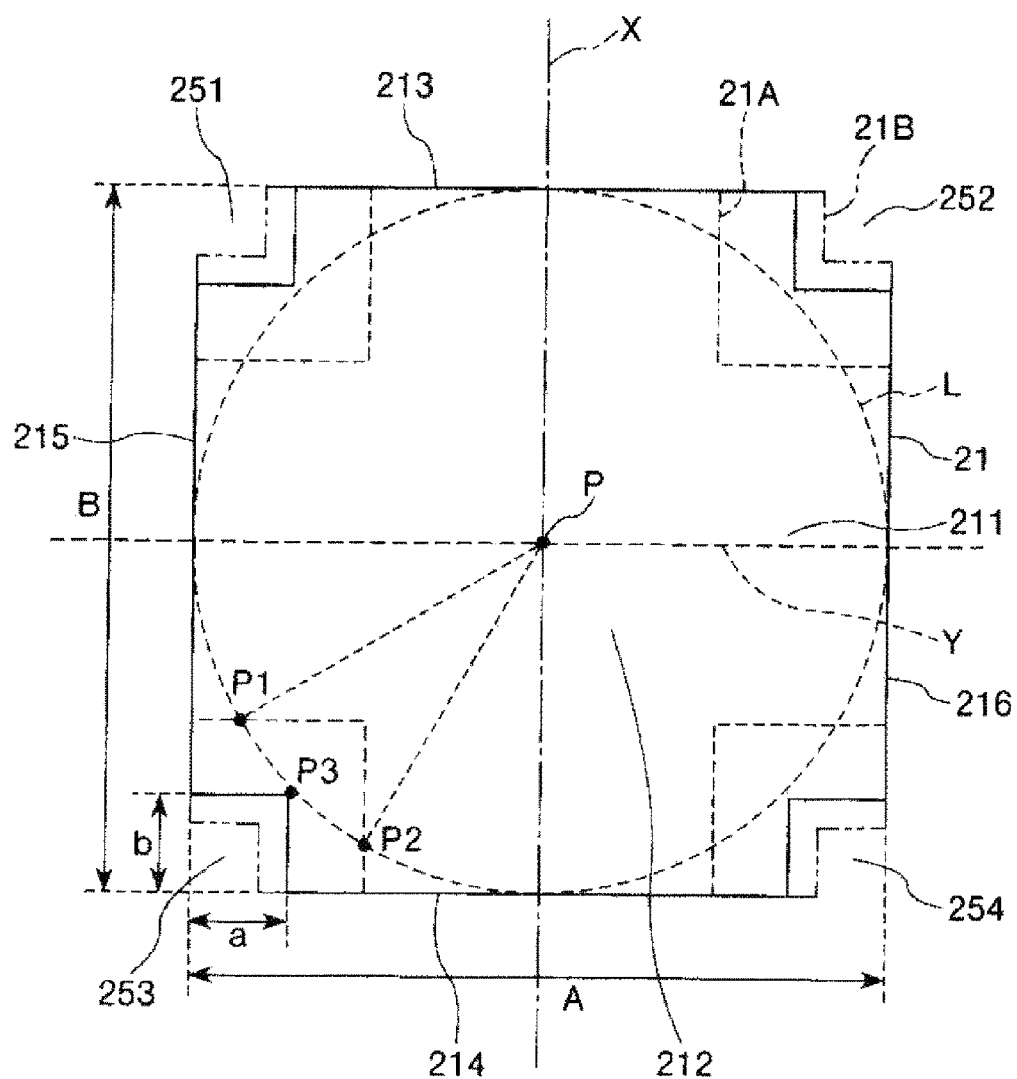
FIG. 3 is a plan view for illustrating a movable plate included in the optical scanner shown in FIG. 1.
Figure 4:
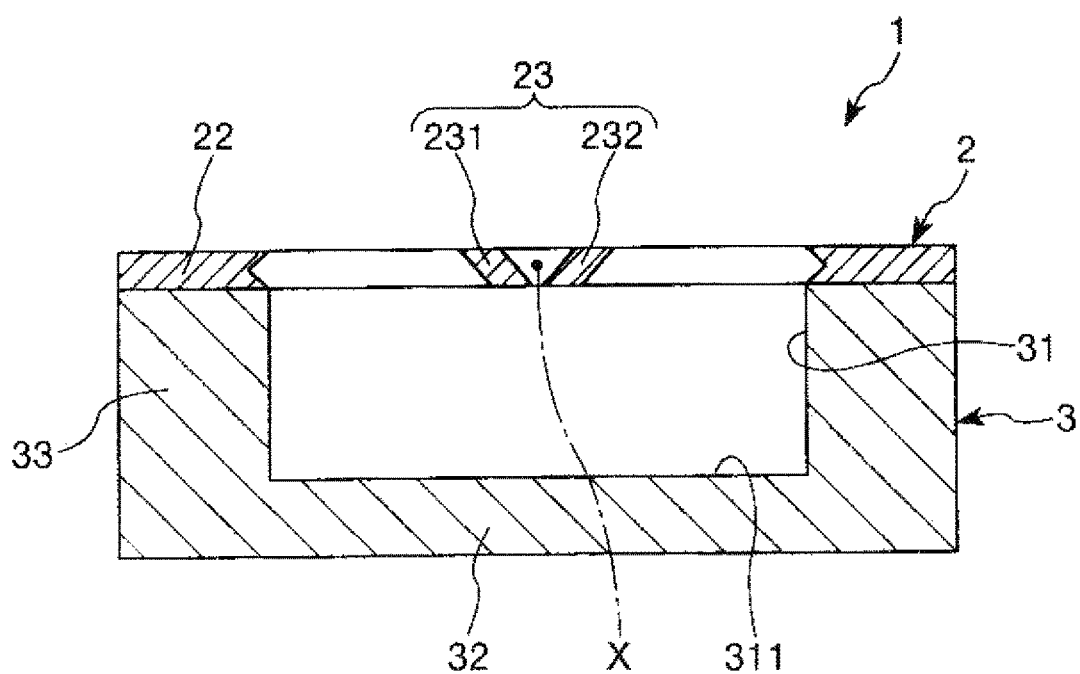
FIG. 4 is a cross-sectional view taken along a line B-B of FIG. 1.
Figure 5:
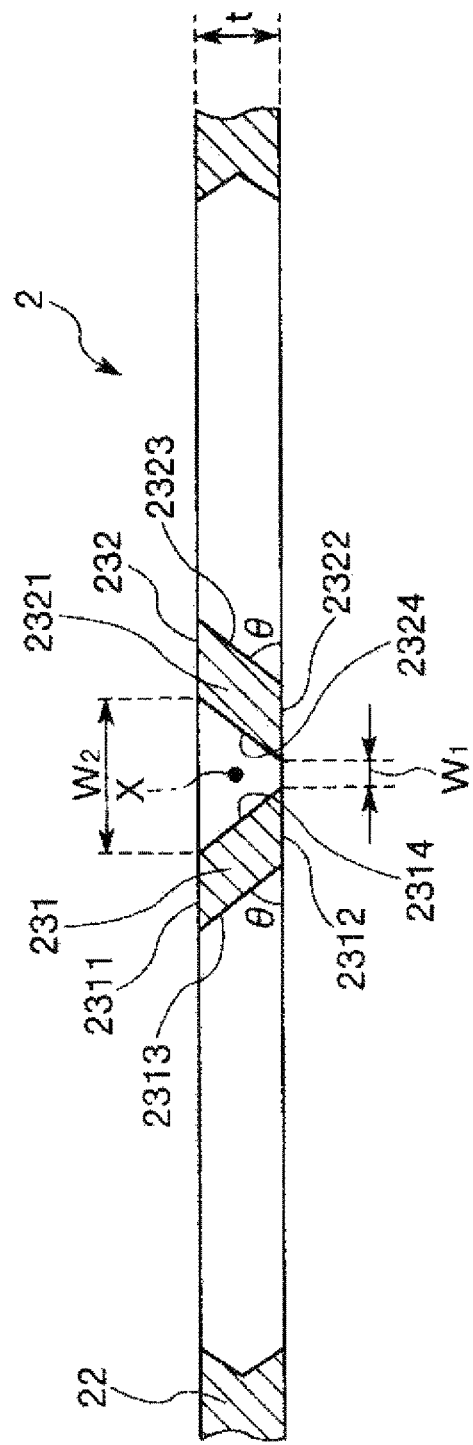
FIG. 5 is a partially enlarged cross-sectional view of FIG. 4.

FIG. 1 is a plan view showing the optical scanner (actuator) according to the first embodiment of the invention, FIG. 2 is a cross-sectional view taken along a line A-A of FIG. 1, FIG. 3 is a plan view for illustrating a movable plate included in the optical scanner shown in FIG. 1, FIG. 4 is a cross-sectional view taken along a line B-B of FIG. 1, and FIG. 5 is a partially enlarged cross-sectional view of FIG. 4. FIGS. 6A to 6G are cross-sectional views illustrating a method of manufacturing the optical scanner shown in FIG. 1, and FIGS. 7A to 7G are cross-sectional views illustrating a method of manufacturing the optical scanner shown in FIG. 1. FIGS. 8A to 8G are cross-sectional views illustrating a method of manufacturing the optical scanner shown in FIG. 1, FIGS. 9A to 9D are views for illustrating formation of a connecting portion (when mask misalignment is not present) in an etching process shown in FIG. 8E, and FIGS. 10A to 10D are views for illustrating formation of the connecting portion (when mask misalignment is present) in the etching process shown in FIG. 8E. Moreover, hereinafter, for the sake of convenience of explanation, the upper side in FIGS. 2 and 4 to 10 is referred to as "up" and the down side is referred to as "down".

As shown in FIG. 1, an optical scanner 1 includes a base body 2 including a vibration system, a support body 3 which supports the base body 2, and a driving portion 4 which vibrates the vibration system of the base body 2.

In addition, the base body 2 includes a movable plate (movable portion) 21 in which a light reflecting portion 211 is provided, a pair of connecting portions 23 and 24 which are connected to the movable plate 21, and a support portion 22 which supports the pair of connecting portions 23 and 24. It can be said that the support portion 22 supports the movable plate 21 via the pair of connecting portions 23 and 24, and it can be also said that the pair of connecting portions 23 and 24 connect the movable plate 21 and the support portion 22.

In the optical scanner 1, a driving force of the driving portion 4 rotates (swings) the movable plate 21 around a predetermined axis along the connecting portions 23 and 24 while torsionally deforming each connecting portion 23 and 24. Thereby, light which is reflected by the light reflecting portion 211 can scan in one predetermined direction.

Hereinafter, each portion configuring the optical scanner 1 will be sequentially described in detail.

Base Body

As described above, the base body 2 includes the movable plate 21 in which the light reflecting portion 211 is provided, the support portion 22 which supports the movable plate 21, and the pair of connecting portions 23 and 24 which connect the movable plate 21 and the support portion 22.

The base body 2 is configured of silicon as the main material, and the movable plate 21, the support portion 22, and the connecting portions 23 and 24 are integrally formed. More specifically, as described hereinafter, the base body 2 is formed by anisotropically etching a silicon substrate in which the plate surface is configured of a (100) plane of silicon. According to the anisotropic etching, it is possible to form the movable plate 21, the support portion 22, and the pair of connecting portions 23 and 24 simply and with high accuracy while using a (111) plane of silicon as an etching stop layer. In addition, in general, a single crystal silicon substrate is used as the silicon substrate.

Moreover, each of an upper surface and a lower surface of the base body 2 is configured of the (100) plane of silicon. In addition, an inner circumferential surface of the support portion 22, a side surface of the movable plate 21, and portions which are parallel to an axis line X of side surfaces of each connecting portion 23 and 24 are configured of the (111) plane of silicon respectively.

Moreover, since the silicon is lightweight and has a rigidity of the same level as a SUS, due to the fact that the base body 2 is configured of silicon as the main material, the base body 2 having improved vibration characteristics can be obtained. In addition, as described below, since the silicon can be processed with highly precise dimensional accuracy by etching, it is possible to obtain the base body 2 having a desired shape (desired vibration characteristics) by forming the base body 2 using the silicon substrate.

Hereinafter, the base body 2 will be described in more detail. As shown in FIG. 1, the support portion 22 is formed in a frame shape. More specifically, the support portion 22 is formed in a square ring shape. The support portion 22 supports the movable plate 21 via the pair of connecting portions 23 and 24. Moreover, the shape of the support portion 22 is not particularly limited if capable of supporting the movable plate 21 via the pair of connecting portions 23 and 24. For example, the support portion may be formed in a shape which is divided corresponding to each connecting portion 23 and 24.

The movable plate 21 is provided in the inner side of the support portion 22.

The movable plate 21 is formed in a plate shape. Moreover, in the embodiment, the movable plate 21 is formed in a shape (cross shape) in which each of four corner-portions of a quadrangle including a pair of sides along a center axis of rotation (the swing axis: axis line X) of the movable plate 21 and a pair of sides along a direction (direction along line Y) perpendicular to the axis line X is removed in a quadrilateral shape in plan view in a thickness direction of the movable plate 21. Thereby, a moment of inertia when the movable plate 21 is rotated can be decreased while an area (light reflection region) of the light reflecting portion 211 of the upper surface of the movable plate 21 is sufficiently secured. Moreover, as described hereinafter, the movable plate 21 can be simply formed with high accuracy by anisotropically etching the silicon substrate.

More specifically, as shown in FIG. 3, the movable plate 21 includes a main body portion 212, a pair of protrusions (second protrusions) 213 and 214 which protrude from the main body portion 212 to both sides in a direction parallel to the axis line X, and a pair of protrusions (first protrusions) 215 and 216 which protrude from the main body portion 212 to both sides in a direction (direction parallel to a line Y) perpendicular to the axis line X. The movable plate 21 which includes the pair of protrusions 213 and 124 and the pair of protrusions 215 and 216 is formed in a cross shape in plan view in the thickness direction.

In addition, a removed portion 251 is formed between the protrusion 213 and the protrusion 215 in a direction along an outer circumference of the movable plate 21. Moreover, a removed portion 252 is formed between the protrusion 213 and the protrusion 216 in a direction along an outer circumference of the movable plate 21. In addition, a removed portion 254 is formed between the protrusion 214 and the protrusion 216 in a direction along an outer circumference of the movable plate 21. Moreover, a removed portion 253 is formed between the protrusion 214 and the protrusion 215 in a direction along an outer circumference of the movable plate 21.

In other words, in plan view in the thickness direction of the movable plate 21, the removed portion 251, the protrusion 213, the removed portion 252, the protrusion 216, the removed portion 254, the protrusion 214, the removed portion 253, and the protrusion 215 are provided side by side in this order along the outer circumference of the movable plate 21 (main body portion 212).

Moreover, the removed portion 251 and the removed portion 252 face each other via the protrusion 213. In addition, the removed portion 252 and the removed portion 254 face each other via the protrusion 216. Moreover, the removed portion 253 and the removed portion 254 face each other via the protrusion 214. In addition, the removed portion 251 and the removed portion 253 face each other via the protrusion 215.

The protrusions 213 to 216 and the removed portions 251 to 254 each are formed in a quadrangle in plan view in the thickness direction of the movable plate 21. In addition, in FIGS. 1 and 3, the state in which the shape in plan view of each of removed portions 251 to 254 forms a square is shown as an example. Moreover, corners in the shape in plan view of the protrusions 213 to 216 and the removed portion 251 to 254 may be rounded.

In the corners in the outer shape of the cross shape of the movable plate 21, since not only a predetermined crystal plane but also a plurality of crystal planes appear, in some cases, the corners are not strictly a right angle, and the removed portions 251 to 254 are not strictly a quadrangle. However, in the embodiment, each of the removed portions 251 to 254 including the above-described state is considered to be a quadrangle.

The outer shape in the plan view in the thickness direction of the movable plate 21 is mainly configured of a line parallel to the center axis of rotation (axis line X) of the movable plate 21 and a line (line Y) perpendicular to the center axis of rotation (axis line X) of the movable plate 21. Thereby, as described hereinafter, the movable plate 21 can be simply formed with high accuracy by anisotropically etching the silicon substrate. Moreover, not only a predetermined crystal plane but also a plurality of crystal planes appear in the corners in the outer shape of the cross shape of the movable plate 21. Accordingly, the outer shape of the corners in plan view in the thickness direction of the movable plate 21 is not formed in lines parallel to the axis line X or the line Y. That is, the outer shape in plan view in the thickness direction of the movable plate 21 is configured of the line parallel to the axis line X and the line parallel to the line Y at least except the corners of the movable plate 21.

Moreover, the movable plate 21 is formed in a shape which is symmetrical with respect to the center axis of rotation (axis line X) of the movable plate 21 in plan view. Thereby, the center of gravity of the movable plate 21 is simply positioned on the center axis of rotation of the movable plate 21, and the rotation of the movable plate 21 can be smoothly performed. In addition, the movable plate 21 is formed in a shape which is symmetrical with respect to the line Y, which passes through a center P of the movable plate 21 and is perpendicular with respect to the center axis of rotation (axis line X) of the movable plate 21 in plan view. Thereby, design of the movable plate is easily performed.

Moreover, the plate surface (upper surface and lower surface) of the movable plate 21 is configured of the (100) plane of silicon. Thereby, as described hereinafter, the movable plate 21, the support portion 22, and the pair of connecting portions and 24 can be simply formed with high accuracy by anisotropically etching the silicon substrate in which the plate surface is configured of the (100) plane.

In addition, side surfaces (particularly, surface parallel to axis line X) of the movable plate 21 are mainly configured of the (111) plane of silicon. Thereby, as described hereinafter, the movable plate 21, the support portion 22, and the pair of connecting portions 23 and 24 can be simply formed with high accuracy using the (111) plane of silicon as the etching stop layer by anisotropically etching the silicon substrate in which the plate surface is configured of the (100) plane. Moreover, the side surfaces of the movable plate 21 include crystal planes other than the (111) plane in the corners of the outer shape in plan view in the thickness direction of the movable plate 21. Accordingly, the side surfaces of the movable plate 21 are configured of the (111) plane of silicon except at least for the side surfaces at the corners.

In addition, a groove 217 having a V shape in a cross-section perpendicular to the plate surface of the movable plate 21 is formed in the side surfaces of the movable plate 21. Thereby, the moment of inertia of the movable plate 21 can be decreased. In addition, the groove can be simply formed with high accuracy using the (111) plane of silicon as the etching stop layer by anisotropically etching the silicon substrate in which the plate surface is configured of the (100) plane.

In addition, when a length in a direction (hereinafter, also referred to as a "direction of the line Y") perpendicular to the center axis of rotation (axis line X) in plan view in the thickness direction of the movable plate 21 is A, a length in a direction (hereinafter, also referred to as a "direction of the axis line X") parallel to the center axis of rotation (axis line X) of the movable plate 21 is B, a length along the direction of the line Y of each of removed portions 251 to 254 is a, and a length along the direction of the axis line X of each of removed portions 251 to 254 is b, the following equations (A) and (B) are satisfied. Moreover, here, a is the same as the protruded length of each of protrusions (first protrusion) 215 and 216 in plan view of the movable plate 21, and b is the same as the protruded length of each of protrusions (second protrusion) 213 and 214 in plan view of the movable plate 21.

$$0.8 \times \left\{ \frac{1}{2}\left(A - \sqrt{\frac{1}{\frac{3}{A^2} + \frac{1}{B^2}}}\right) \right\} \leq a \leq 2.0 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \leq b \leq 2.0 \times \left\{ \frac{1}{2}\left(B - \sqrt{\frac{1}{\frac{3}{A^2} + \frac{1}{B^2}}}\right) \right\} \quad (B)$$

Due to the fact that the equations (A) and (B) each are satisfied, the moment of inertia when the movable plate 21 is rotated can be effectively decreased while an area which is necessary for the light reflection in the light reflecting portion 211 of the movable plate 21 is secured.

In contrast, if each of the lengths a and b is less than the lower limit, the effects of decreased moments of inertia when the movable plate 21 is rotated may be reduced respectively. Thereby, according to the thickness of the movable plate 21, dynamic deflection of the movable plate 21 may be increased, and optical characteristics of the optical scanner 1 may be decreased.

On the other hand, if the lengths a and b are more than the upper limit, the area of the light reflecting portion 211 of the movable plate 21 cannot be effectively used, and intensity of the reflected light at the light reflecting portion 211 tends to be decreased.

Moreover, in FIG. 3, a movable plate 21A in the case where the equations (A) and (B) are satisfied and a and b each are the maximum, and a movable plate 21B in the case where the equations (A) and (B) are satisfied and a and b each are the minimum are shown by a chain line respectively.

Hereinafter, the equations (A) and (B) will be simply described.

As shown in FIG. 3, in a case where a circular or elliptical spot of light L is inscribed in the movable plate 21 in plan view, the areas of each of removed portions 251 to 254 become the maximum at the outside of the spot of the light L when a=(1−1/√2)A and b=(1−1/√2)B. In addition, at this time, the corner P3 of each of the removed portions 251 to 254 is positioned on the outer circumferential edge of the spot of the light L, and a/b=A/B.

Moreover, in this case, in a range in which the effects (particularly, effect which decrease the moment of inertia of the movable plate 21') due to forming the removed portions 251 to 254 are exerted, a is the maximum and b is minimum when a corner P3 of each of removed portions 251 to 254 is positioned at an intersection point P2 between a line inclined by 30° with respect to the axis line X and an outer circumference edge of the spot of the light L. At this time, a and b become as the following equations.

$$a = \left\{ \frac{1}{2}\left(A - \sqrt{\frac{1}{\frac{3}{A^2} + \frac{1}{B^2}}}\right) \right\}$$

$$b = \left\{ \frac{1}{2}\left(B - \sqrt{\frac{1}{\frac{3}{A^2} + \frac{1}{B^2}}}\right) \right\}$$

In addition, in this case, in the range in which the effects (particularly, effect which decrease the moment of inertia of the movable plate 21) due to forming the removed portions 251 to 254 are exerted, a is the minimum and b is maximum when a corner P3 of each of removed portions 251 to 254 is positioned at an intersection point P1 between a line inclined by 60° with respect to the axis line X and an outer circumference edge of the spot of the light L. At this time, a and b become as the following equations.

$$a = \left\{ \frac{1}{2}\left(A - \sqrt{\frac{1}{\frac{1}{3A^2} + \frac{1}{B^2}}}\right) \right\}$$

$$b = \left\{ \frac{1}{2}\left(B - \sqrt{\frac{1}{\frac{1}{3A^2} + \frac{1}{B^2}}}\right) \right\}$$

In addition, in general, an effective range of the spot diameter of a laser which is generally used as the light L becomes a range of brightness which is equal to or more than $1/e^2$ of peak brightness. Therefore, an ideal light reflection can be performed if the effective range falls within the light reflecting portion 211.

However, in the actual laser, some light is present even outside of the effective range. In addition, the moment of inertia at the time of the rotation of the movable plate 21 may be suppressed so that a dynamic deflection of the movable plate 21 is λ/4 or less of the wavelength. Therefore, the laser is acceptable without any problems in actual use even though a and b are slightly smaller or greater with respect to the value. Specifically, the allowed values of a and b which are obtained as described above may be −20% or more and +200% or less. Here, based on when A=B=2.0 mm, a=(1−1/√2)A [mm], and b=(1−1/√2)B [mm], luminance of reflected light at the movable plate 21 when a and b each are −20%, −200%, and +205% is visually evaluated, and the results are shown in Table 1.

TABLE 1

| | a, b | | | |
|---|---|---|---|---|
| | −20% | Reference 2(1 − 1/√2) [mm] | +200% | +205% |
| Luminance determination (visual observation) | A | B | B | C |

In Table 1, "A" indicates that the luminance of the reflected light is sufficient, "B" indicates that the luminance of the reflected light is no problem in actual use, and "C" indicates that the luminance of the reflected light is not sufficient. In addition, as described above, the allowable range of the dynamic deflection is λ/4 or less of the wavelength. Therefore, for example, when λ=530 nm, the allowable range of the dynamic deflection is 133 nm or less. In the reference, if the dynamic deflection is obtained by a FEM analysis when the movable plate is driven at 10° in the mechanical angle and 18 kHz in the driving frequency, the dynamic deflection is 122 nm, which becomes within the allowable range. Moreover, in the −20% of the reference, if the dynamic deflection is obtained by the FEM analysis when the movable plate is driven at 10° in the mechanical angle and 18 kHz in the driving frequency, the dynamic deflection is 130 nm, which becomes within the allowable range. In contrast, in the −25% of the reference, if the dynamic deflection is obtained by a FEM analysis when the movable plate is driven at 10° in the mechanical angle and 18 kHz in the driving frequency, the dynamic deflection is 140 nm, which becomes outside the allowable range.

From the above, the equations (A) and (B) can be obtained. Moreover, in the movable plate 21, the lengths A and B may be equal or different to each other. In addition, in FIG. 1, the case of A=B is shown.

In the embodiment, in each of four corner-portions (removed portions 251 to 254) in plan view of the movable plate 21, a relationship of a≤b is satisfied. Thereby, it is possible to most effectively decrease the moment of inertia at the time of the rotation of the movable plate 21.

Moreover, the following equations (C) and (D) may be more preferably satisfied.

$$0.9 \times \left\{ \frac{1}{2}\left( A - \sqrt{\frac{1}{\frac{3}{A^2} + \frac{1}{B^2}}} \right) \right\} \le a \le 1.6 \times \left\{ \frac{1}{2}\left( A - \sqrt{\frac{1}{\frac{1}{3A^2} + \frac{1}{B^2}}} \right) \right\} \quad (C)$$

$$0.9 \times \left\{ \frac{1}{2}\left( B - \sqrt{\frac{1}{\frac{1}{3A^2} + \frac{1}{B^2}}} \right) \right\} \le b \le 1.6 \times \left\{ \frac{1}{2}\left( B - \sqrt{\frac{1}{\frac{3}{A^2} + \frac{1}{B^2}}} \right) \right\} \quad (D)$$

Thereby, it is possible to effectively decrease the moment of inertia at the time of the rotation of the movable plate 21 while optimally securing the light reflection region of the movable plate 21.

The light reflecting portion 211 having light reflectivity is provided on the upper surface of the movable plate 21. On the other hand, a permanent magnet 41 of the driving portion 4 described below is provided on the lower surface of the movable plate 21. In addition, the permanent magnet 41 will be described in detail in a description of the driving portion 4 described hereinafter.

The connecting portions 23 and 24 each are formed in a longitudinal shape and configured so as to be elastically deformed. In addition, the connecting portion 23 and the connecting portion 24 face each other via the movable plate 21. The connecting portions 23 and 24 each connect the movable plate 21 and the support portion 22 so that the movable plate 21 is rotated with respect to the support portion 22. The pair of connecting portions 23 and 24 are coaxially provided along the axis line X, and the movable plate 21 is rotated with respect to the support portion 22 with the axis line X as the center axis of rotation.

In the embodiment, as shown in FIG. 1, the connecting portion 23 is configured of a pair of beam members 231 and 232. Similarly, the connecting portion 24 is configured of a pair of beam members 241 and 242.

It is possible to reduce the length of the connecting portions 23 and 24 configured in this way, compared to the case where the connecting portion is configured of one member. Hereby, it is possible to reduce the area of the optical scanner 1 in the plate thickness direction in plan view. Hereinafter, the connecting portion 23 will be described as the representative, since the connecting portion 24 is similar to the connecting portion 23, the description is omitted.

The beam members 231 and 232 each are provided along the axis line X and face to each other via the axis line X. In addition, each of the beam members 231 and 232 has the parallelogrammatic cross-section.

More specifically, the outer shape of the cross-section of each of the beam members 231 and 232 is a parallelogram including a pair of sides along the (100) plane of silicon and a pair of sides along the (111) plane of silicon. That is, in the beam member 231, an upper surface 2311 and a lower surface 2312 are each configured of the (100) plane of silicon, a pair of side surfaces 2312 and 2314 each are configured of the (111) plane of silicon. Similarly, in the beam member 232, an upper surface 2321 and a lower surface 2322 are each configured of the (100) plane of silicon, a pair of side surfaces 2323 and 2324 are each configured of the (111) plane of silicon. Here, since the side surfaces 2313, 2314, 2323 and 2324 are each configured of the (111) plane of silicon, the inclination angle θ with respect to the upper surface or the lower surface of the base body (that is the (100) plane of silicon) is 54.73°. The beam members 231 and 232 having the above-mentioned cross-sectional shape can be formed simply and reliably by anisotropically etching the silicon substrate in which the plate surface is configured of the (100) plane of silicon.

In this way, if the outer surfaces of the connecting portion 23 are configured of the (100) plane and the (111) plane of silicon, as described below, the connecting portion 23 can be simply formed with high accuracy using the (111) plane of silicon as the stop layer of the etching.

In addition, when viewed from a direction parallel to the axis line X (in other words, when viewed from the cross-section shown in FIG. 5), the beam members 231 and 232 are formed in a shape which is symmetrical with respect to a line which vertically extends and passes through the axis line X.

Moreover, in the cross-section shown in FIG. 5, a width of the entire connecting portion 23 (face-to-face distance between side surface 2313 of the beam member 231 and side surface 2323 of beam member 232) is widened from the lower side toward the upper side.

Moreover, in the cross-section shown in FIG. 5, the distance (width of gap) between the beam member 231 and the beam member 232 is lengthened from the lower side toward the upper side. That is, when viewed from the direction parallel to the center axis of rotation of the movable plate 21, the distance between the pair of the beam members 231 and 232 is gradually increased from a side of one side surface toward a side of the other side surface (from the lower side toward the upper side in the embodiment) of the movable plate 21.

The connecting portion 23 can be simply formed with high accuracy by anisotropically etching the silicon substrate described hereinafter collectively with the movable plate 21 having the shape in plan view described above.

In addition, the following equation (1) is satisfied when a distance between ends of the lower sides of the pair of beam members 231 and 232 is $W_1$ and a thickness in the thickness direction of the movable plate 21 of the pair of beam members 231 and 232 is t.

$$w_1 < \frac{t}{\tan 54.73°} \quad (1)$$

As described in more detail below, since the silicon substrate, in which the plate surface is configured of the (100) plane of silicon, is anisotropically etched from both surface sides, when the movable plate 21, the support portion 22, and the pair of connecting portions 23 and 24 are formed, the formation positions of the masks which are formed on both surfaces of the silicon substrate may be deviated. In this way, if the formation positions of the masks of both surfaces of the silicon substrate are deviated from each other, a step is generated in the pair of side surfaces 2313, 2314, 2323, and 2324 which are to be configured on the (111) plane of silicon of each of beam members 231 and 232. When the formation positions of the masks formed on both surfaces of the silicon substrate are deviated from each other, due to the fact that the equation (1) is satisfied, the step which is formed on the side surface of one side and the step which is formed on the side surface of the other side can be shifted in the thickness direction of the silicon substrate (refer to FIGS. 10A to 10D). Thereby, stress concentration which is generated in each of the beam members 231 and 232 when the movable plate 21 is rotated can be alleviated.

In this way, in the optical scanner 1, damage due to the stress concentration at the time of the driving of the optical scanner can be relatively simply prevented.

In addition, the following equation (2) is satisfied when a distance between ends of the upper sides of the pair of beam members 231 and 232 is $W_2$.

$$t < \frac{\tan 54.73°}{2}(w_1 + w_2) \quad (2)$$

Thereby, the connecting portion 23 which is configured of the pair of beam members 231 and 232 can be simply and reliably formed by anisotropically etching the silicon substrate, in which the plate surface is configured of the (100) plane of silicon, from both surface sides.

Support Body

The support body 3 includes a function which supports the above-described base body 2. Moreover, the support body 3 also includes a function which supports a coil 42 of the driving portion 4 described below.

The support body 3 is formed in a box shape including a concave portion 31 which is opened upward. In other words, the support body 3 includes a plate-shaped portion 32 which is formed in a plate shape, and a frame-shaped portion 33 which is provided along the outer circumference portion of the upper surface of the plate-shaped portion 32 and is formed in a frame shape. The lower surface of the support portion 22 of the above-described base body 2 is bonded to a portion outside the concave portion 31 among the upper surfaces of the support body 3, that is, on the upper surface of the frame-shaped portion 33. Thereby, a space which allows the rotation of the movable plate 21 is formed between the movable plate 21 and the pair of connecting portions 23 and 24 of the base body 2 and the support body 3.

A constituent material of the support body 3 is not particularly limited. For example, the constituent material may include a glass material such as quartz glass, Pyrex Glass ("Pyrex" is trademark), or TEMPAX glass, a silicon material such as single crystal silicon, or poly silicon, a LTCC (low temperature sintering ceramics), or the like.

In addition, the method of bonding the base body 2 and the support body 3 can be appropriately determined according to the constituent material of the support body 3, the shape, or the like, and is not particularly limited. The bonding method may include a method using an adhesive, an anodic bonding method, a direct bonding method, or the like.

Driving Portion

The driving portion 4 includes the permanent magnet 41 and the coil 42 and rotatably drives the above-described movable plate 21 of the base body 2 by an electromagnetic drive system (more specifically, a moving magnet type electromagnetic drive system). The electromagnetic drive system can generate a great driving force. Thereby, according to the driving portion 4 which adopts the electromagnetic drive system), a deflection angle of the movable plate 21 can be greater while a lower driving voltage is improved.

For example, the permanent magnet 41 is fixed to the lower surface of the movable plate 21 through an adhesive. Moreover, the magnet 41 is formed in a longitudinal shape and is provided so as to extend in the direction perpendicular with respect to the axis line X in plan view. The permanent magnet 41 is magnetized in a longitudinal direction, and one side in the longitudinal direction becomes an S pole and the other side becomes an N pole. The permanent magnet 41 is provided so as to extend in the direction perpendicular with respect to the axis line X, and therefore, both ends of the permanent magnet 41 can be positioned away from the axis line X. Thereby, great torque can be applied by the movable plate 21 through effects of a magnetic field which is generated by the coil 42.

The permanent magnet 41 is not particularly limited. For example, the permanent magnet may appropriately use those, in which a hard magnetic material is magnetized, such as a neodymium magnet, a ferrite magnet, a samarium-cobalt magnet, an alnico magnet, or a bonded magnet.

The coil 42 is provided on a lower surface 311 of the concave portion 31 of the support body 3 so as to face the movable plate 21. Thereby, the magnetic field which is generated by the coil 42 can effectively act on the permanent magnet 41. The coil 42 is electrically connected to a power source (not shown), and a voltage (alternating voltage, an intermittent direct current, or the like) which is periodically changed from the power source is applied to the coil.

Through the driving portion 4, the movable plate 21 is rotated as follows.

First, for example, the alternating voltage is applied to the coil 42 by a power source (not shown). Thereby, a first magnetic field in which the upper side (movable plate 21 side) of the coil 42 becomes an N pole and the lower side thereof becomes an S pole and a second field in which the upper side of the coil 42 becomes an S pole and the lower side thereof becomes an N pole are alternately and periodically generated. In a first electric field, the movable plate 21 is rotated counterclockwise about the axis line X in FIG. 2 so that the S pole side is separated from the coil 42 while the N pole side of the permanent magnet 41 is attracted to the coil 42 (first state). On the contrary, in a second electric field, the movable plate 21 is rotated clockwise about the axis line X in FIG. 2 so that the N pole side is separated from the coil 42 while the S pole side of the permanent magnet 41 is attracted to the coil 42 (second state). The first state and the second state are alternately repeated, and the movable plate 21 is rotated about the axis center X.

Method of Manufacturing Actuator

For example, the above-described optical scanner 1 may be manufactured as follows. Hereinafter, as an example of the method of manufacturing the actuator of the invention, The method of manufacturing the optical scanner 1 will be described with reference to FIG. 6A to 10G. In addition, FIGS. 6A to 8G each are shown according to the cross-section corresponding to FIG. 2, and FIGS. 9A to 10D each are shown according to the cross-section corresponding to FIG. 5.

The method of manufacturing the optical scanner 1 includes the processes of forming the base body 2.

The processes of forming the base body 2 include [A] a process of forming a concave portion 218 and [B] a process of forming the movable plate 21, the support portion 22, and the pair of connecting portions 23 and 24.

Hereinafter, each process will be sequentially described in detail.

A. Process of Forming Concave Portion 218

—A1—

Figure 6A:
FIGS. 6A to 6G are cross-sectional views illustrating a method of manufacturing the optical scanner shown in FIG. 1.

First, as shown in FIG. 6A, a silicon substrate 102 is prepared. The silicon substrate 102 becomes the base body 2 by being subjected to etching described below.

Specifically, the silicon substrate 102 is one in which the principal surface is configured of the (100) plane of silicon.

—A2—

Figure 6B:
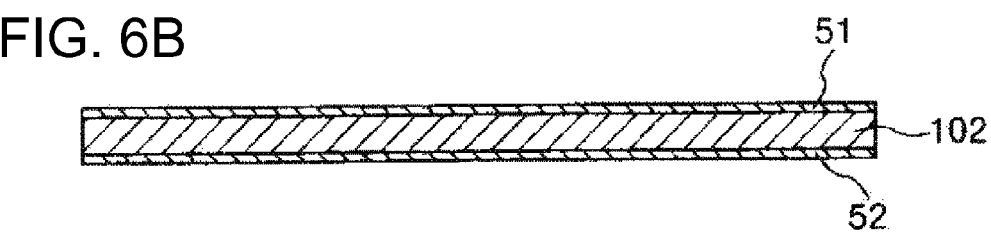

Next, as shown in FIG. 6B, a nitride film 51 is formed on an upper surface of silicon substrate 102, and a nitride film 52 is formed on the lower surface of the silicon substrate 102. For example, the nitride films 51 and 52 each are configured of SiN.

In addition, methods of forming the nitride films 51 and 52 each are not particularly limited. For example, the methods may use a vapor deposition method such as a plasma chemical vapor deposition (plasma CVD).

Moreover, the thickness of the nitride films 51 and 52 is not particularly limited, and the thickness may be about 0.01 μm or more and 0.2 μm or less.

Moreover, instead of the nitride films 51 and 52, for example, an oxide film configured of SiO may be formed by a thermal oxidation method.

—A3—

Figure 6C:
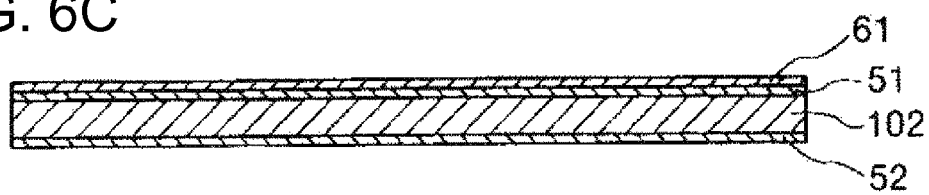
Figure 6D:
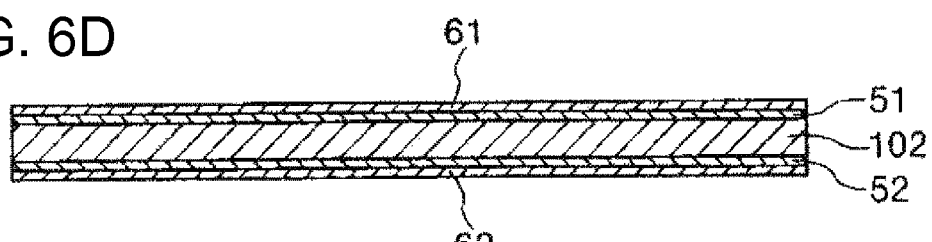

Next, as shown in FIG. 6C, a resist film 61 is formed on the nitride film 51, and as shown in FIG. 6D, a resist film 62 is formed on the nitride film 52.

The resist films 61 and 62 each are configured of a positive or a negative resist material.

—A4—

Figure 6E:
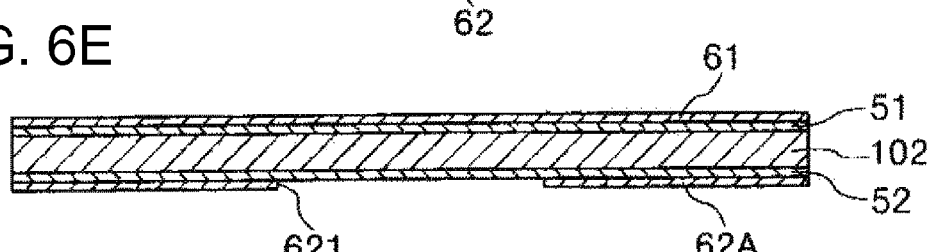

Next, the portion corresponding to the formation region of the concave portion 218 of the resist film 62 is removed by exposing or developing the resist film 62. Thereby, as shown in FIG. 6E, a resist film 62A including an opening 621 is obtained.

—A5—

Figure 6F:
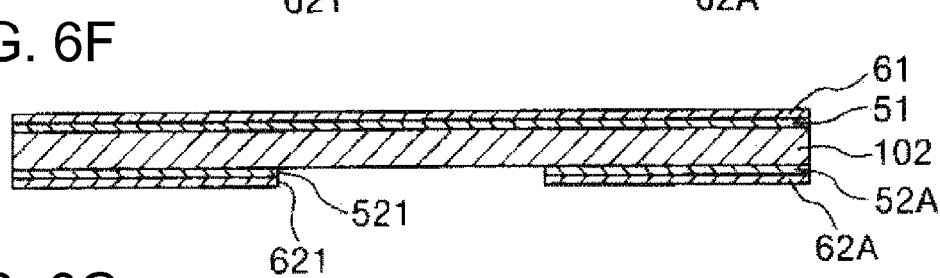

Next, a portion of the nitride film 52 is removed by etching using the resist film 62A as a mask. Thereby, as shown in FIG. 6F, a nitride film 52A including an opening 521 is obtained. The etching (method of forming opening 521) is not particularly limited. For example, the etching may include reactive ion etching (RIE), dry etching using $CF_4$, or the like.

—A6—

Next, the resist films 61 and 62A are removed.

Figure 6G:
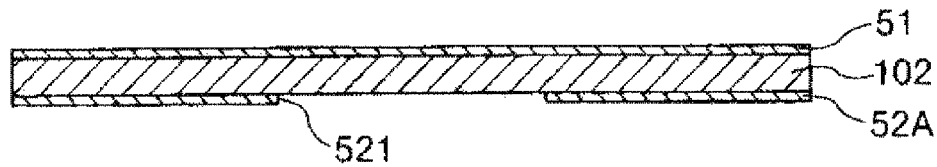

Thereby, as shown in FIG. 6G, the upper surface of the silicon substrate 102 is covered with the nitride film 51, and the lower surface thereof is covered with the nitride film 52A.

The method of removing the resist films 61 and 62A is not particularly limited. For example, the removing method may include washing with sulfuric acid, $O_2$ ashing, or the like.

—A7—

Figure 7A:
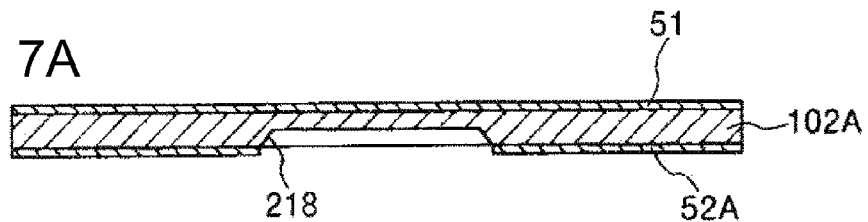
FIGS. 7A to 7G are cross-sectional views illustrating a method of manufacturing the optical scanner shown in FIG. 1.

Next, the silicon substrate 102 is etched by using the nitride film 52A as a mask. Thereby, as shown in FIG. 7A, a silicon substrate 102A including the concave portion 218 is obtained. The etching (method of forming concave portion 218) is not particularly limited. The etching may appropriately use anisotropic etching similar to etching for forming the movable plate 21, the support portion 22, or the like described below. The anisotropic etching is not particularly limited. For example, the etching may be performed by wet etching which uses a KOH aqueous solution or the like.

—A8—

Figure 7B:
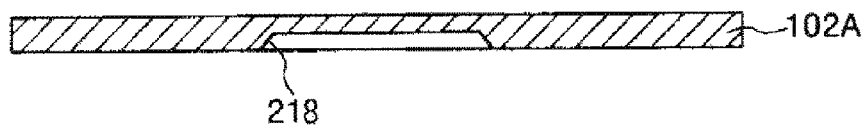

Next, the nitride films 51 and 52A are removed. Thereby, as shown in FIG. 7B, the upper surface and the lower surface of the silicon substrate 102A are exposed.

The method of removing the nitride films 51 and 52A is not particularly limited. For example, similar to the process A5, the reactive ion etching (RIE), the dry etching using $CF_4$, or the like may be used.

B. Process of Forming Movable Plate 21, Support Portion 22, or the Like

—B1—

Figure 7C:
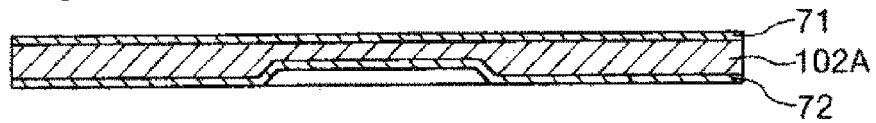

Next, as shown in FIG. 7C, a nitride film 71 is formed on the upper surface of the silicon substrate 102A, and a nitride film 72 is formed on the lower surface of the silicon substrate 102A. For example, the nitride films 71 and 72 each are configured of SiN.

In addition, methods of forming the nitride films 71 and 72 each are not particularly limited. For example, similar to the process A2, the methods may use the vapor deposition method such as the plasma chemical vapor deposition (plasma CVD). In addition, the thickness of the nitride films 71 and 72 is not particularly limited, and the thickness may be about 0.01 μm or more and 0.3 μm or less.

Moreover, instead of the nitride films 71 and 72, for example, an oxide film configured of SiO may be formed by a thermal oxidation method.

—B2—

Figure 7D:
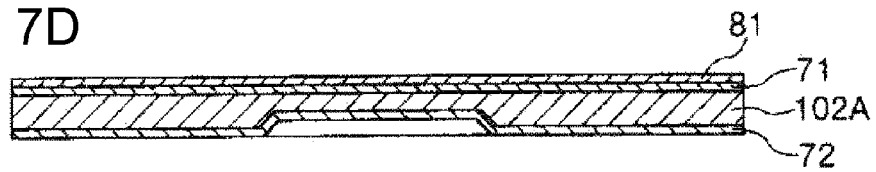

Next, as shown in FIG. 7D, a resist film 81 is formed on the nitride film 71.

The resist film 81 is configured of a positive or a negative resist material.

—B3—

Figure 7E:
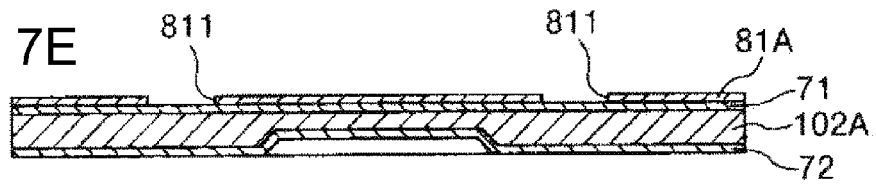

Next, a portion of the resist film 81 is removed by exposing and developing the resist film 81 so that portions corresponding to the formation regions of the movable plate 21, the support portion 22, and the pair of connecting portions 23 and 24 of the resist film 81 remain. Thereby, as shown in FIG. 7E, a resist film 81A including an opening 811 is obtained. Moreover, although not shown in FIG. 7E, an opening which is formed so as to correspond to a gap between the upper ends of the pair of beam members 231 and 232 is also formed on the resist film 81A.

—B4—

Figure 7F:
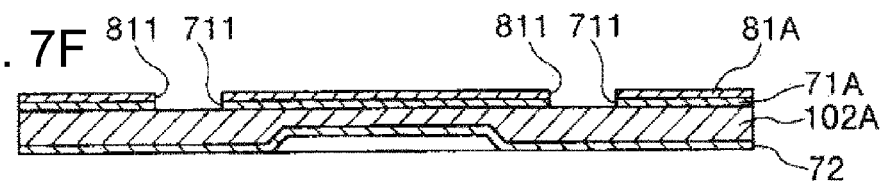

Next, a portion of the nitride film 71 is removed by etching using the resist film 81A as a mask. Thereby, as shown in FIG. 7F, a nitride film 71A including an opening 711 is obtained. Moreover, although not shown in FIG. 7F, an opening which is formed so as to correspond to a gap between the upper ends of the pair of beam members 231 and 232 is also formed on the nitride film 71A.

The etching (method of forming opening 711) is not particularly limited. For example, similar to the process A5, the etching may include the reactive ion etching (RIE), the dry etching using $CF_4$, or the like.

—B5—

Figure 7G:
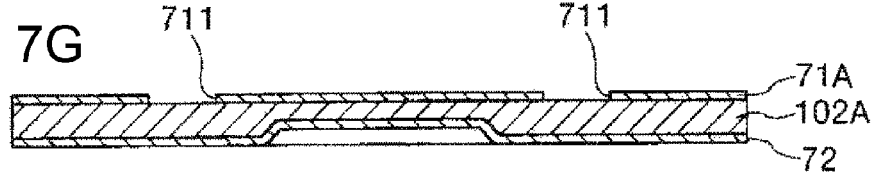

Next, the resist film 81A is removed. Thereby, as shown in FIG. 7G, the upper surface of the silicon substrate 102A is covered with the nitride film 71A, and the lower surface thereof is covered with the nitride film 72.

The method of removing the resist film 81A is not particularly limited. For example, the removing method may include washing with sulfuric acid, $O_2$ ashing, or the like.

—B6—

Figure 8A:
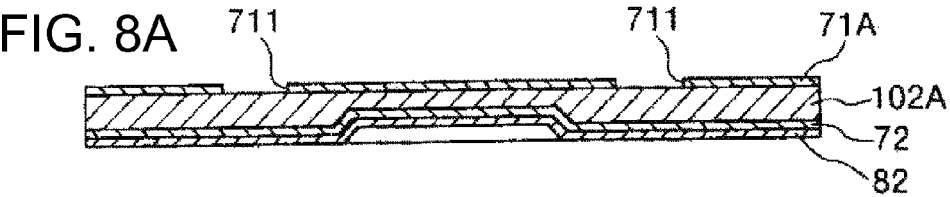
FIGS. 8A to 8G are cross-sectional views illustrating a method of manufacturing the optical scanner shown in FIG. 1.

Next, as shown in FIG. 8A, a resist film 82 is formed on the nitride film 72.

The resist film 82 is configured of a positive or a negative resist material.

—B7—

Figure 8B:
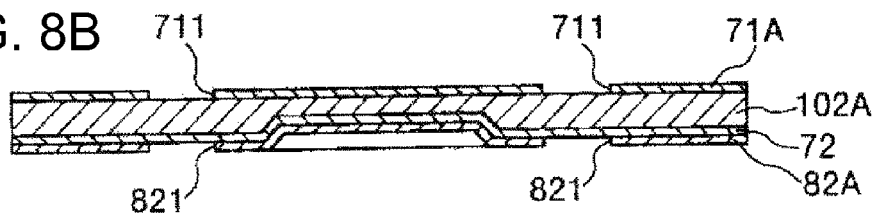

Next, a portion of the resist film 82 is removed by exposing and developing the resist film 82 so that portions corresponding to the formation regions of the movable plate 21, the support portion 22, and the pair of connecting portions 23 and 24 of the resist film 82 remain. Thereby, as shown in FIG. 8B, a resist film 82A including an opening 821 is obtained. Moreover, although not shown in FIG. 8B, an opening which is formed so as to correspond to a gap between the lower ends of the pair of beam members 231 and 232 is also formed on the resist film 82A.

—B8—

Figure 8C:
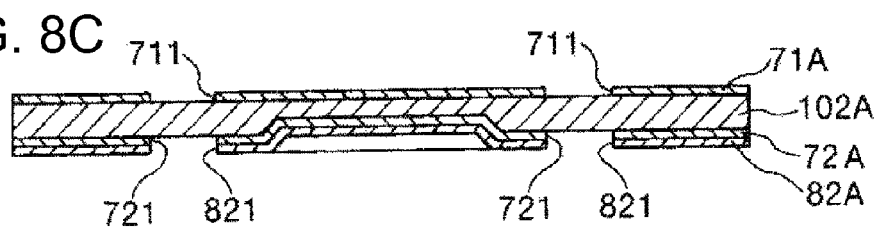

Next, a portion of the nitride film 72 is removed by etching using the resist film 82A as a mask. Thereby, as shown in FIG. 8C, a nitride film 72A including an opening 721 is obtained. In addition, although not shown in FIG. 8C, an opening which is formed so as to correspond to a gap between the lower ends of the pair of beam members 231 and 232 is also formed on the nitride film 72A.

The etching (method of forming opening 721) is not particularly limited. For example, similar to the process A5, the etching may include the reactive ion etching (RIE), the dry etching using $CF_4$, or the like.

—B9—

Figure 8D:
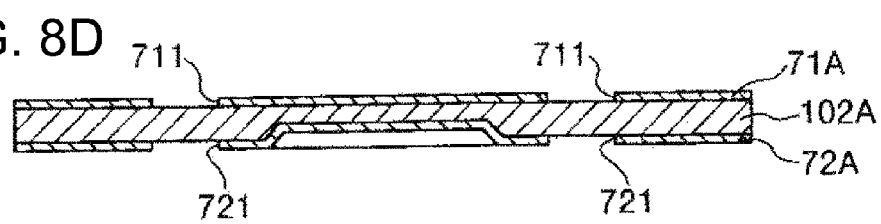

Next, the resist film 82A is removed. Thereby, as shown in FIG. 8D, the upper surface of the silicon substrate 102A is covered with the nitride film 71A, and the lower surface thereof is covered with the nitride film 72A.

The method of removing the resist film 82A is not particularly limited. For example, the removing method may include washing with sulfuric acid, $O_2$ ashing, or the like.

—B10—

Figure 8E:
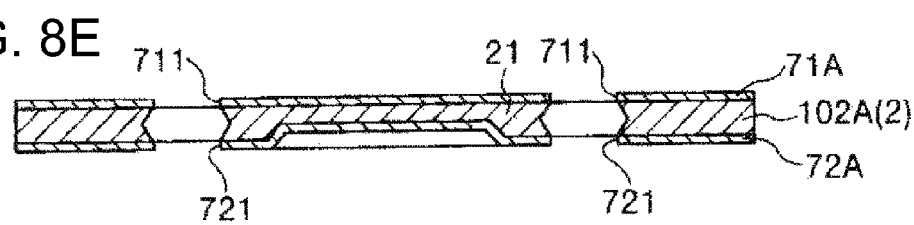

Next, the silicon substrate 102A is anisotropically etched by using the nitride films 71A and 72A as a mask. Thereby, as shown in FIG. 8E, the base body 2 is obtained. That is, in the anisotropic etching of the process, the silicon substrate 102A is anisotropically etched from both surface sides via the nitride film 72A which is a first mask and the nitride 71A which is a second mask, and therefore, the movable plate 21, the support portion 22, and the pair of connecting portions 23 and 24 are formed.

The anisotropic etching (method of forming base body 2) is not particularly limited. For example, the etching may be performed by wet etching which uses a KOH aqueous solution or the like.

Here, formation of the connecting portion 23 by the anisotropic etching will be described in detail. In addition, since formation of the connecting portion 24 is similar to the formation of the connecting portion 23, the description is omitted.

As shown in FIGS. 9A to 9D, the nitride film 71A which is used as the mask (second mask) includes a portion 712 which is formed so as to correspond to the formation region in the upper surface of the beam member 231 of the connecting portion 23 and a portion 713 which is formed so as to correspond to the formation region in the upper surface of the beam member 232 of the connecting portion 23, and an opening 714 (second opening) is formed between the portion 712 and the portion 713. The opening 714 is formed so as to correspond to the gap between the upper ends of the pair of beam members 231 and 232.

In addition, the nitride film 72A which is used as the mask (first mask) includes a portion 722 which is formed so as to correspond to the formation region in the lower surface of the beam member 231 of the connecting portion 23 and a portion 723 which is formed so as to correspond to the formation region in the lower surface of the beam member 232 of the connecting portion 23, and an opening 724 (first opening) is formed between the portion 722 and the portion 723. The opening 724 is formed so as to correspond to the gap between the lower ends of the pair of beam members 231 and 232.

Here, a relationship of the following equation (3) is satisfied when a width of the opening 724 is $W_{m1}$ and the thickness of the silicon substrate 102A is T.

$$w_{m1} < \frac{T}{\tan 54.73°} \quad (3)$$

Due to the fact that the relationship equation is satisfied, even when the positional relationships between the nitride film 72A which is the first mask and the nitride film 71A which is the second mask are deviated from each other and a step is generated in the pair of side surfaces to be configured of the (111) plane of silicon of each of the beam members 231 and 232, the step which is formed in the side surface of one side and the step which is formed in the side surface of the other side can be shifted in the thickness direction of the silicon substrate. Thereby, in the obtained actuator, stress concentration which is generated in each of the beam members 231 and 232 when the movable plate 21 is rotated can be alleviated.

The following equation (4) is satisfied when a width of the opening 714 is $W_{m2}$.

$$T < \frac{\tan 54.73°}{2}(w_{m1} + w_{m2}) \quad (4)$$

Thereby, the silicon substrate 102A in which the plate surface is configured of the (100) plane of silicon is anisotropically etched from both surface sides, and therefore, the connecting portion 23 which is configured of the pair of beam members 231 and 232 can be simply and reliably formed.

Hereinafter, generation of the step in the anisotropic etching of the process will be described in detail.

When the anisotropic etching of the process is performed, in a case where the formation positions of the nitride films 71A and 72A used as the mask are not deviated, as shown in FIGS. 9A to 9D, the upper surface of the silicon substrate 102A is etched via the openings 711 and 714 and the lower surface of the silicon substrate 102A is etched via the openings 721 and 724, and the pair of beam members 231 and 232 are formed.

Figure 9A:
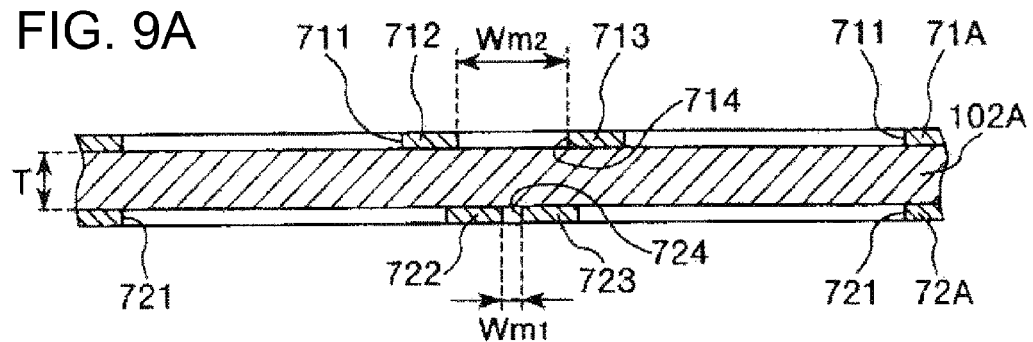
FIGS. 9A to 9D are views for illustrating formation of a connecting portion (when mask misalignment is not present) in an etching process shown in FIG. 8E.
Figure 9B:
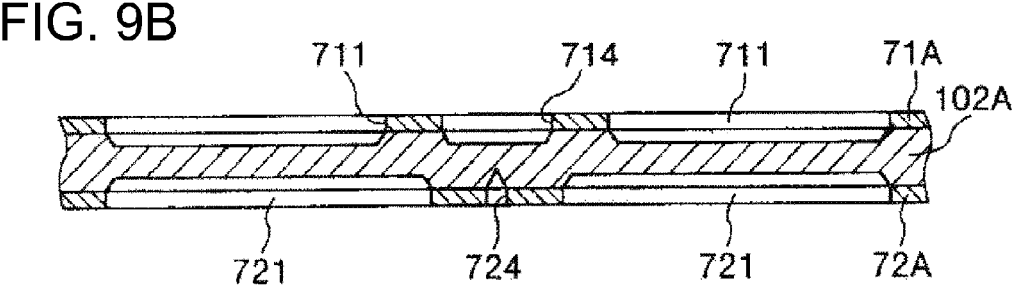
Figure 9C:
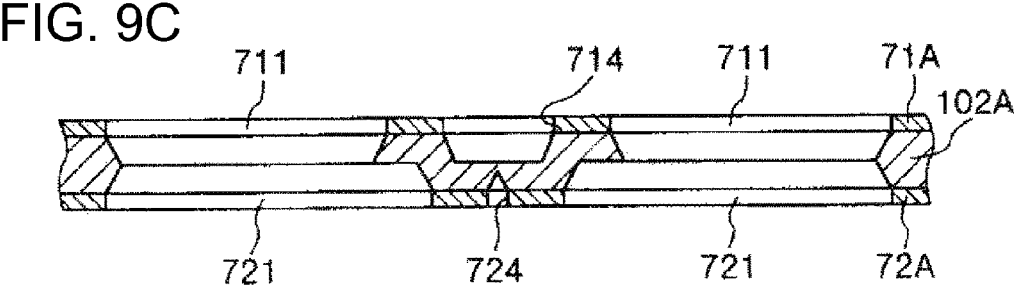
Figure 9D:
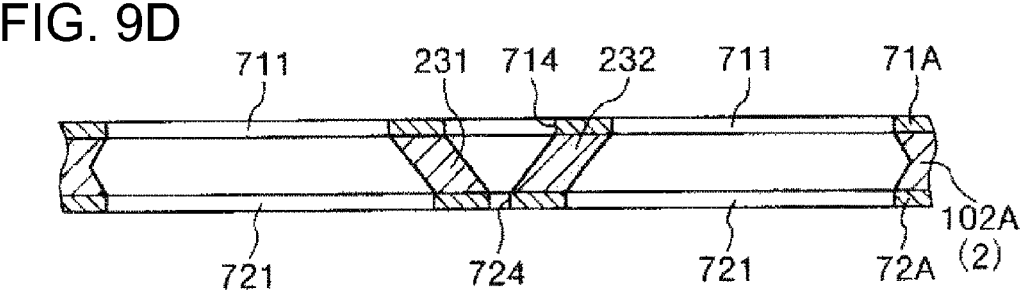

In this case, since the center positions in the width direction of the opening 714 and the opening 724 coincide with each other in the width direction, as shown in FIG. 9D, each side surface of each of the beam members 231 and 232 does not include a step and becomes a constantly inclined surface which is configured of the (111) plane of silicon.

On the other hand, when the anisotropic etching of the process is performed, in a case where the formation positions of the nitride films 71A and 72A used as the mask are deviated, as shown in FIGS. 10A to 10D, the upper surface of the silicon substrate 102A is etched via the openings 711 and 714 and the lower surface of the silicon substrate 102A is etched via the openings 721 and 724, and a pair of beam members 231A and 232A are formed.

Figure 10A:
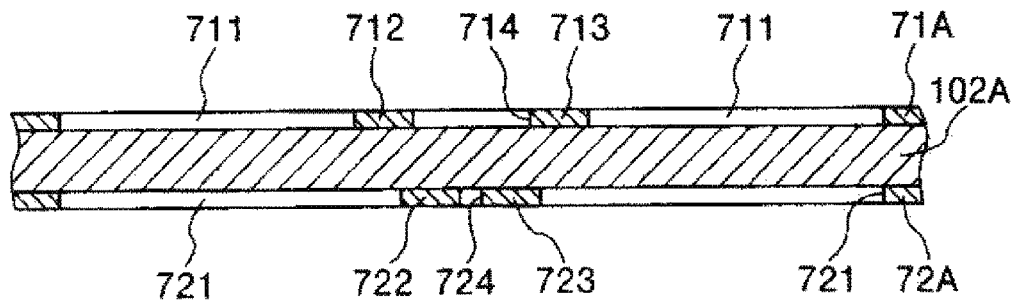
FIGS. 10A to 10D are views for illustrating formation of the connecting portion (when mask misalignment is present) in the etching process shown in FIG. 8E.
Figure 10B:
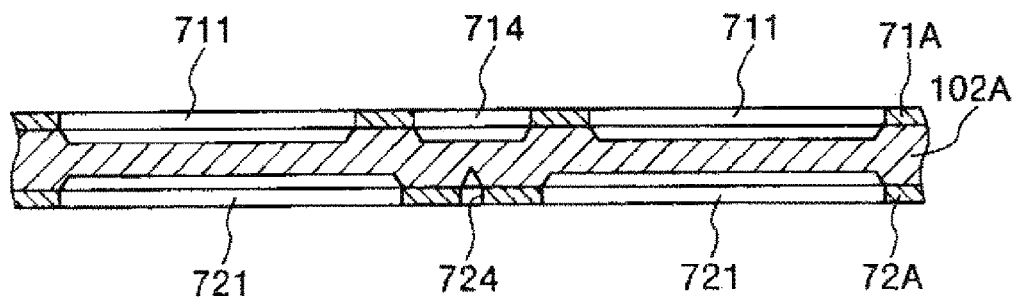
Figure 10C:
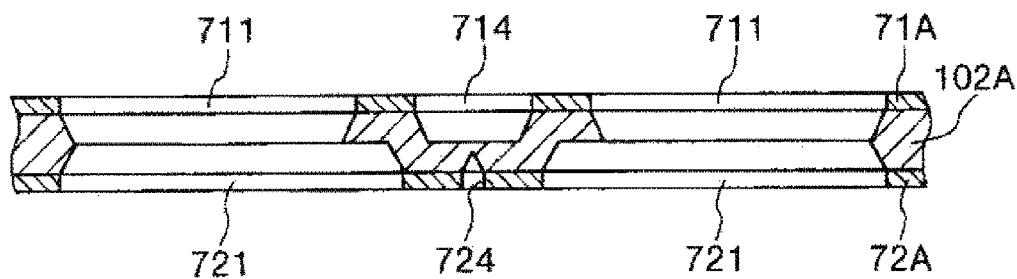
Figure 10D:
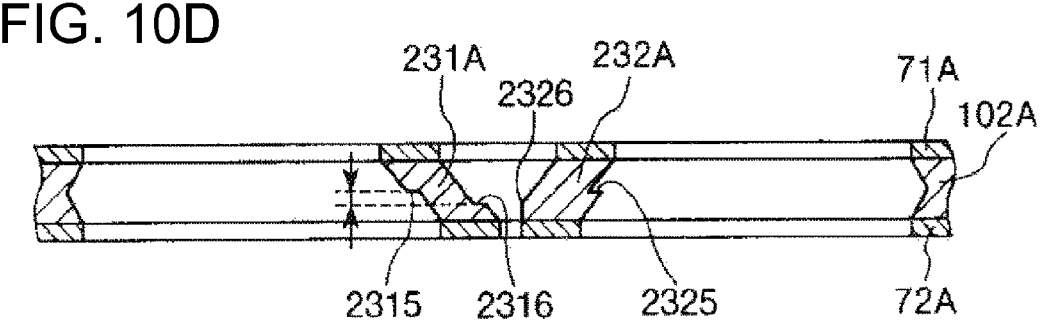

In this case, since the center positions in the width direction of the opening 714 and the opening 724 are different from each other in the width direction, as shown in FIG. 10D, a step 2315 is formed in the side surface of one side of the beam member 231A, and a step 2316 is formed in the side surface of the other side of the beam member 231A. In addition, similar to this, a step 2325 is formed in the side surface of one side of the beam member 232, and a step 2326 is formed in the side surface of the other side of the beam member 232.

As described above, since the width of the opening 724 of the nitride film 72A used as the mask is formed so as to satisfy the equation (3), the step 2316 is formed to the nitride film 72A side (lower side) rather than the center in the thickness direction of the silicon substrate 102A.

In contrast, since the widths of the opening 711 of the nitride film 71A and the opening 721 of the nitride film 72A are too much greater than the thickness of the silicon substrate 102A, the step 2315 is formed in the center in the thickness direction of the silicon substrate 102A.

Thereby, the positions of the step 2315 and the step 2316 in the thickness direction of the silicon substrate 102A are different from each other. Similarly, the positions of the step 2325 and the step 2326 in the thickness direction of the silicon substrate 102A are different from each other.

In this way, since the positions of the step 2315 and the step 2316 in the thickness direction of the silicon substrate 102A are different from each other, it is possible to prevent or suppress stress from being concentrated in the center portion in the thickness direction of the beam member 231A when the movable plate 21 is rotated. Similarly, it is possible to prevent or suppress stress from being concentrated in the center portion in the thickness direction of the beam member 232 when the movable plate 21 is rotated. As a result, it is possible to prevent the connecting portion 23 from being damaged due to the stress concentration at the time of the driving. Similarly, it is possible to prevent the connecting portion 24 from being damaged due to the stress concentration at the time of the driving.

If the width of the opening 724 does not satisfy the equation (3), all steps 2315, 2316, 2325, and 2326 are formed in the center position in the thickness direction of the silicon substrate 102A. That is, the positions in the thickness direction of the silicon substrate 102A of the steps 2315, 2316, 2325, and 2326 are the same as one another. Thereby, there is a concern that the connecting portions may be damaged due to the stress concentration at the time of the driving.

—B11—

Figure 8F:
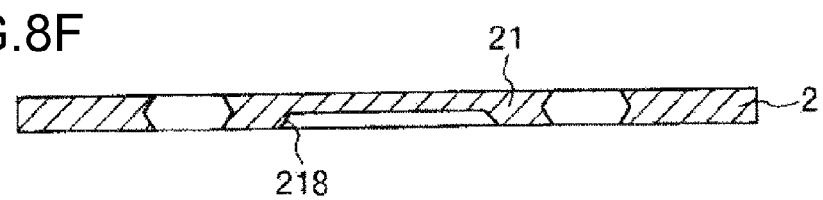

Next, the nitride films 71A and 72A are removed. Thereby, as shown in FIG. 8F, the upper surface and the lower surface of the base body 2 are exposed.

The method of removing the nitride films 71A and 72A is not particularly limited. For example, similar to the process A5, the reactive ion etching (RIE), the dry etching using $CF_4$, a wet process with hot phosphoric acid, or the like may be used. Moreover, processing which rounds the corners of the base body 2 is performed if necessary.

The processing (round processing) is not particularly limited. For example, isotropic etching with hydrofluoric acid, nitric acid, and acetic acid (or water), heat treatment (under reduced pressure, about 1000 to 1200° C., and Ar atmosphere in which $H_2$ is introduced), or the like may be used.

Figure 8G:
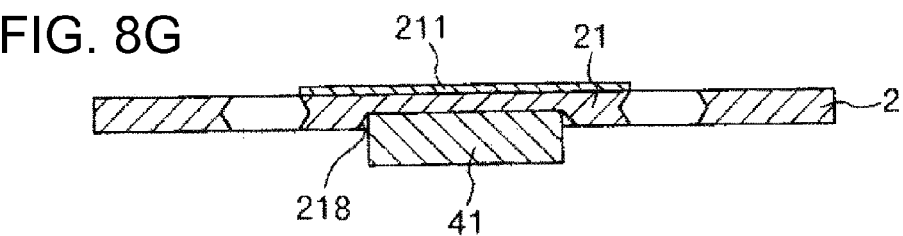

Next, as shown in FIG. 8G, the permanent magnet 41 is fixed on the lower surface of the movable plate 21 via an adhesive. Moreover, a hard magnetic material is fixed on the lower surface of the movable plate 21 via an adhesive, thereafter, the permanent magnet 41 may be achieved by magnetizing the hard magnetic material.

In addition, a metal film is formed on the upper surface of the movable plate 21, and the light reflecting portion 211 is formed. The method of forming the metal film is not particularly limited. For example, a dry plating method such as vacuum deposition, sputtering (low temperature sputtering), or ion plating, a wet plating method such as electrolytic plating, or electroless plating, a thermal spraying method, bonding of a metal foil, or the like may be used.

Moreover, although not shown, the coil 42 is provided on the support body 3, and the support body 3 and the base body 2 are bonded to each other.

According to the above-described processes, the optical scanner 1 is obtained.

According to the method of manufacturing the optical scanner 1 as described above, since the equation (3) is satisfied, in the obtained optical scanner 1 (actuator), it is possible to alleviate the stress concentration which is generated in each of the beam members 231, 232, 241, and 242 when the movable plate 21 is rotated.

According to the optical scanner 1 (actuator) according to the first embodiment described above, since the movable plate 21 is formed in a cross shape in plan view and the equations (A) and (B), it is possible to decrease the moment of inertia at the time of the rotation of the movable plate 21 while securing the light reflection region of the movable plate 21.

In addition, the movable plate 21 can be simply formed with high accuracy by anisotropically etching the silicon substrate.

Second Embodiment

Figure 11:
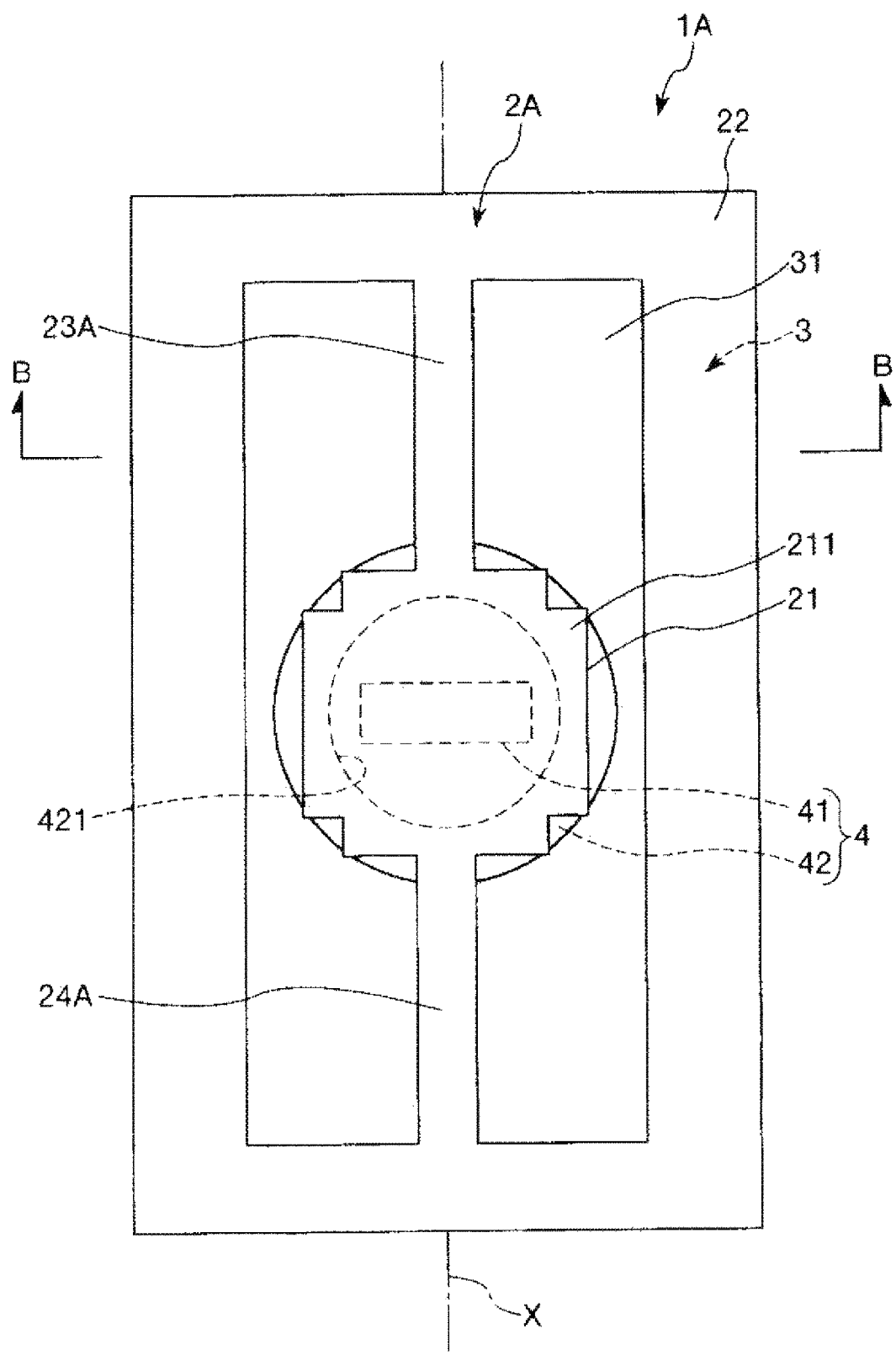
FIG. 11 is a plan view showing an optical scanner according to a second embodiment of the invention.
Figure 12:
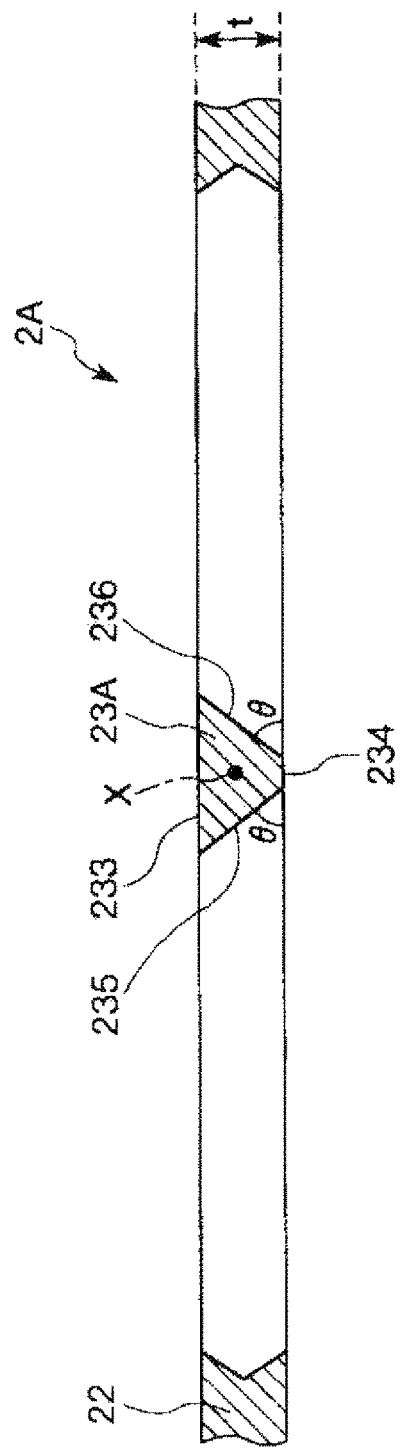
FIG. 12 is a partially enlarged cross-sectional view taken along a line B-B of FIG. 11.

Next, a second embodiment of the invention will be described. FIG. 11 is a plan view showing an optical scanner according to the second embodiment of the invention, and FIG. 12 is a partially enlarged cross-sectional view taken along a line B-B of FIG. 11.

Hereinafter, components of the optical scanner of the second embodiment which are different from those of the optical scanner of the above-described embodiment will be described, and those the same as each other are omitted.

The optical scanner of the second embodiment is substantially the same as the optical scanner 1 of the first embodiment expect that the cross-sectional shapes of the connecting portions are different from each other. In addition, the configurations which are similar as those of the above-described embodiment are denoted by the same reference numerals.

As shown in FIG. 11, an optical scanner 1A of the second embodiment includes a base body 2A including a vibration system. The base body 2A includes the movable plate 21, the support portion 22, and a pair of connecting portions 23A and 24A which rotatably connect the movable plate 21 to the support portion 22.

Hereinafter, the connecting portion 23A will be described as the representative, since the connecting portion 24A is similar to the connecting portion 23A, the description is omitted. The connecting portion 23A is provided along the axis line X. In addition, the cross-sectional shape of the connecting portion 23A is a trapezoid.

More specifically, when viewed from the direction parallel to the axis line X (in other words, when viewed from a cross-section shown in FIG. 12), the connecting portion 23A is formed in a shape which is symmetrical (bilaterally symmetrical in FIG. 12) with respect to a line which vertically extends and passes through the axis line X.

Moreover, in the cross-section shown in FIG. 12, a width of the entire connecting portion 23A is widened from the lower side toward the upper side.

In addition, the outer shape of the cross-sections of the connecting portion 23A includes a pair of sides along the (100) plane of silicon and a pair of sides along the (111) plane of silicon. That is, in the connecting portion 23A, an upper surface 233 and a lower surface 234 each are configured of the (100) plane of silicon, and a pair of side surfaces 235 and 236 each are configured of the (111) plane of silicon. Here, the angle θ of each of the side surfaces 235 and 236 which are inclined with respect to the upper surface 233 or the lower surface 234 becomes 54.73°. Similar to the connecting portion 23 of the above-described first embodiment, the connecting portion 23A having the cross-sectional shape can be simply formed with high accuracy by anisotropically etching the silicon substrate in which the plate surface is configured of the (100) plane of silicon.

Also according to the optical scanner 1A of the above-described second embodiment, it is possible to decrease the moment of inertia at the time of the rotation of the movable plate while securing the light reflection region, and dimensional accuracy of the movable plate can be simply improved.

Third Embodiment

Figure 13:
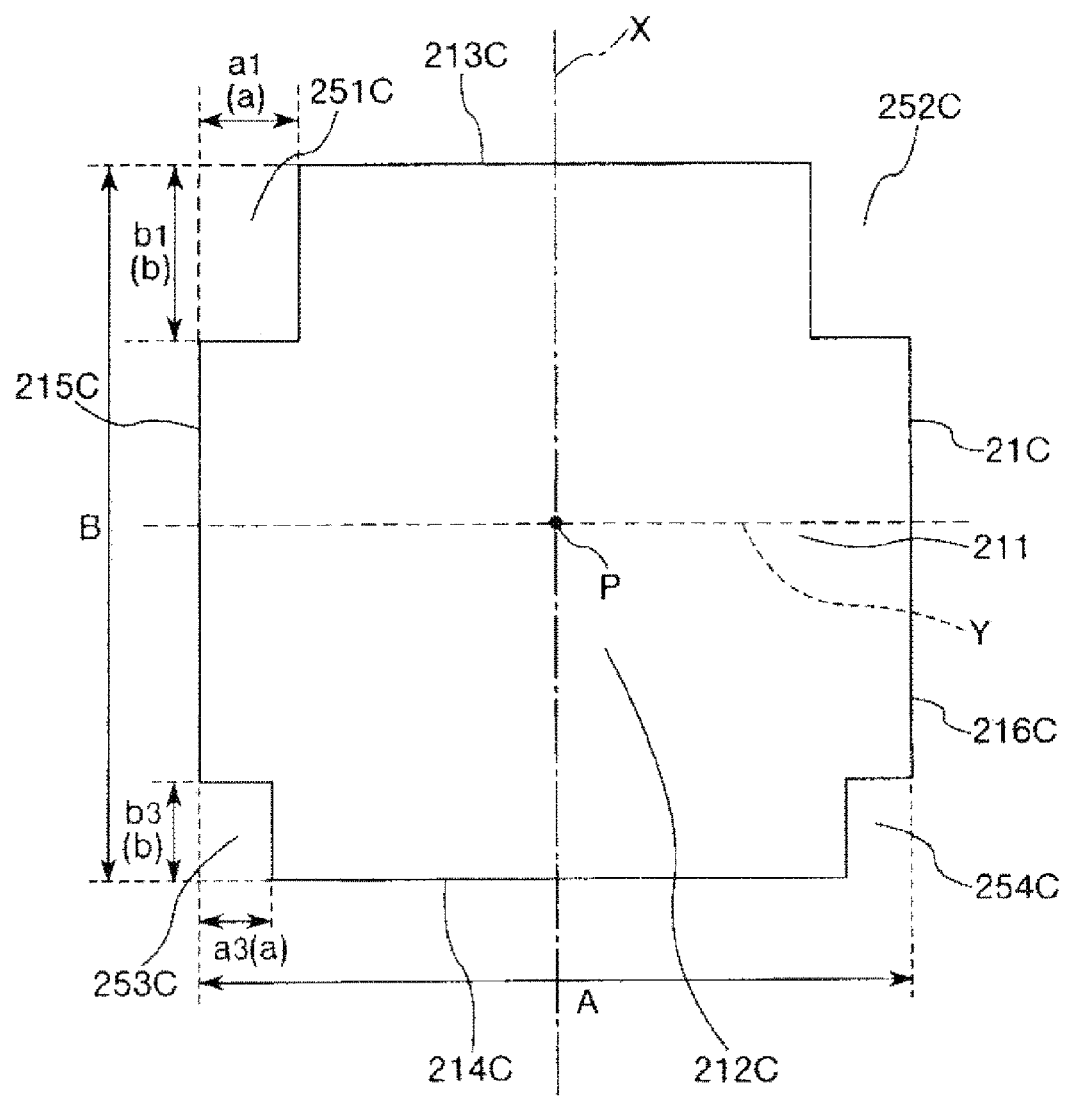
FIG. 13 is a plan view for illustrating a movable plate which is included in an optical scanner according to a third embodiment of the invention.

Next, a third embodiment of the invention will be described. FIG. 13 is a plan view for illustrating a movable plate which is included in an optical scanner according to the third embodiment of the invention.

Hereinafter, components of the optical scanner of the third embodiment which are different from those of the optical scanners of the above-described embodiments will be mainly described, and those the same are omitted.

The optical scanner of the third embodiment is substantially the same as the optical scanner 1 of the first embodiment expect that the movable plate in the shape in the plan view is different from that of the first embodiment. In addition, the configurations which are similar as those of the above-described embodiments are denoted by the same reference numerals.

As shown in FIG. 13, a movable plate 21C included in the optical scanner of the third embodiment includes a main body portion 212C, a pair of protrusions 213C and 214C which protrude from the main body portion 212C to both sides in the direction of the axis line X, and a pair of protrusions 215C and 216C which protrude from the main body portion 212C to both sides in the direction of the line Y. Thereby, the movable plate 21C is formed in a cross shape in plan view.

In addition, a removed portion 251C is formed between the protrusion 213C and the protrusion 215C in the direction along the outer circumference of the movable plate 21C. Moreover, a removed portion 252C is formed between the protrusion 213C and the protrusion 216C in the direction along the outer circumference of the movable plate 21C. In addition, a removed portion 254C is formed between the protrusion 214C and the protrusion 216C in the direction along the outer circumference of the movable plate 21C. Moreover, a removed portion 253C is formed between the protrusion 214C and the protrusion 215C in the direction along the outer circumference of the movable plate 21C.

In the third embodiment, the movable plate 21C is formed so as to be symmetrical with respect to the axis line X in plan view from the plate thickness direction. However, the movable plate is formed so as to be asymmetrical with respect to the line Y in the plan view. In addition, hereinafter, the removed portions 251C and 253C will be described as the representative. However, the removed portions 252C and 254C are also similar. More specifically, a relationship of a1<b1 is satisfied when a length along the direction of the line Y of the removed portion 251C is a1 and a length along the direction of the axis line X of the removed portion 251C is b1. That is, the removed portion 251C is formed in a rectangle in which the length along the direction of the axis line X is longer than the length along the direction of the line Y. Thereby, mass in a distal end from the axis line X of the movable plate 21C can be effectively decreased. Thereby, it is possible to effectively suppress the moment of inertia at the time of the rotation of the movable plate 21C.

Similarly, a relationship of a3<b3 is satisfied when a length in the direction of the line Y of the removed portion 253C is a3 and a length in the direction of the axis line X of the removed portion 253C is b3. That is, the removed portion 253C is formed in a rectangle in which the length in the direction of the axis line X is longer than the length in the direction of the line Y. Thereby, mass in a distal end from the axis line X of the movable plate 21C can be effectively decreased. Therefore, it is possible to effectively suppress the moment of inertia at the time of the rotation of the movable plate 21C.

Moreover, relationships of a1>a3 and b1>b3 are satisfied. Thereby, when light is inclined with respect to the axis of the axis line X and is incident to the light reflecting portion 211, it is possible to effectively secure the light reflection region.

Moreover, even in the movable plate 21C, the equations (A) and (B) each are satisfied when a length in the direction of the line Y in plan view of the movable plate 21C is A, a length in the direction of the axis line X in plan view of the movable plate 21C is B, the lengths in the direction of the line Y of each of the removed portions 251C to 254C are a, and the lengths in the direction of the axis line X of each of the removed portions 251C to 254C are b.

Also according to the optical scanner of the above-described third embodiment, it is possible to decrease the moment of inertia at the time of the rotation of the movable plate while securing the light reflection region, and dimensional accuracy of the movable plate can be simply improved.

Fourth Embodiment

Figure 14:
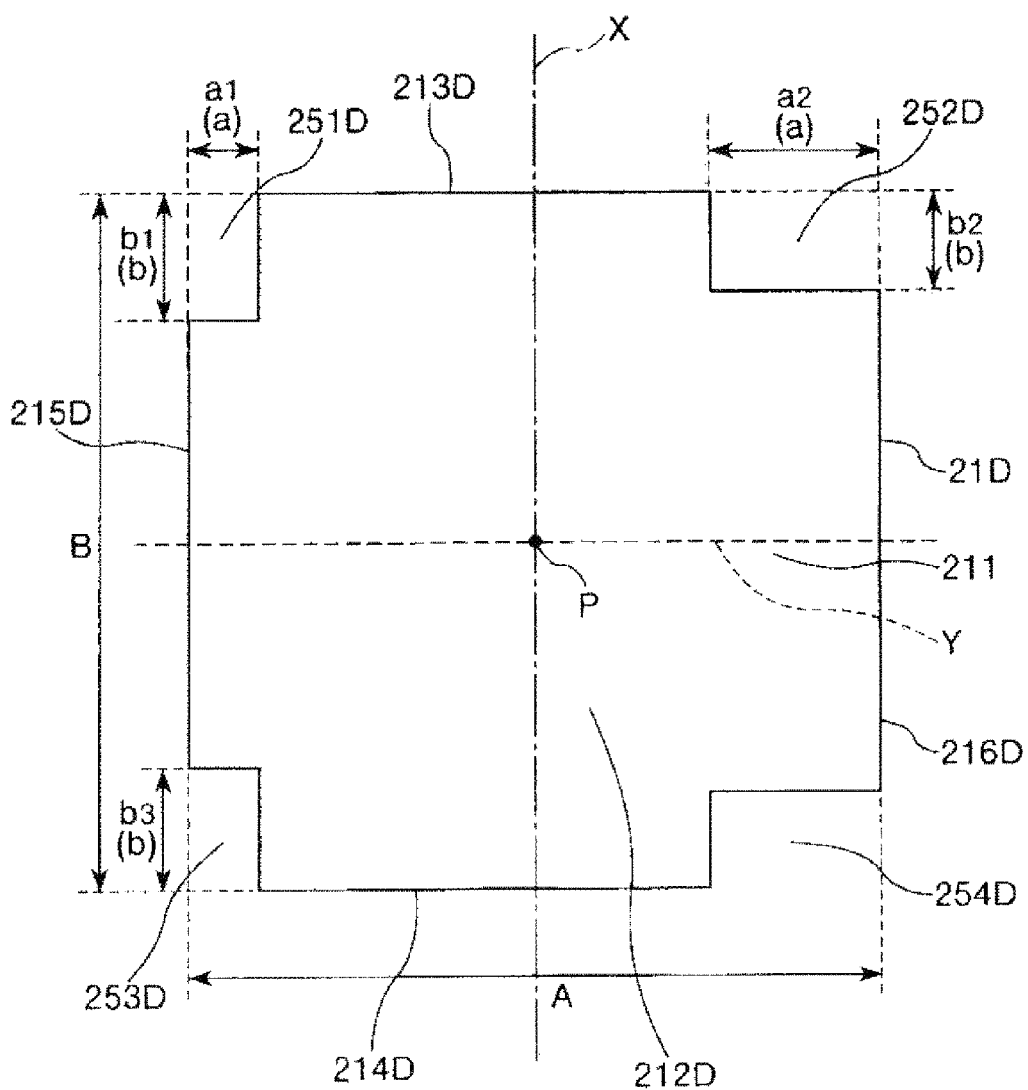
FIG. 14 is a plan view for illustrating a movable plate which is included in an optical scanner according to a fourth embodiment of the invention.

Next, a fourth embodiment of the invention will be described. FIG. 14 is a plan view for illustrating a movable plate which is included in an optical scanner according to the fourth embodiment of the invention.

Hereinafter, components of the optical scanner of the fourth embodiment which are different from those of the optical scanners of the above-described embodiments will be described, and those the same as each other are omitted.

The optical scanner of the fourth embodiment is substantially the same as the optical scanner 1 of the first embodiment expect that the shapes in plan view of the movable plates are different from each other. In addition, the configurations which are similar as those of the above-described embodiments are denoted by the same reference numerals.

As shown in FIG. 14, a movable plate 21D included in the optical scanner of the fourth embodiment includes a main body portion 212D, a pair of protrusions 213D and 214D which protrude from the main body portion 212D to both sides in the direction of the axis line X, and a pair of protrusions 215D and 216D which protrude froth the main body portion 212D to both sides in the direction of the line Y. Thereby, the movable 21D is formed in a cross shape in plan view.

In addition, a removed portion 251D is formed between the protrusion 213D and the protrusion 251D in the direction along the outer circumference of the movable plate 21D. Moreover, a removed portion 252D is formed between the protrusion 213D and the protrusion 216D in the direction along the outer circumference of the movable plate 21D. In addition, a removed portion 254D is formed between the protrusion 214D and the protrusion 216D in the direction along the outer circumference of the movable plate 21D. Moreover, a removed portion 253D is formed between the protrusion 214D and the protrusion 215D in the direction along the outer circumference of the movable plate 21D.

In the fourth embodiment, the movable plate 21D is formed so as to be asymmetrical with respect to the axis line X in plan view, and the movable plate 21D is formed so as to be symmetrical with respect to the line Y in the plan view. In addition, hereinafter, the removed portions 251D and 252D will be described as the representative. However, the removed portions 253D and 254D are also similar.

In addition, among four corner-portions (removed portions 251D to 254D) in plan view of the movable plate 21D, two portions (removed portions 251D and 253D) which are positioned at one side (left side in FIG. 14) with respect to the center axis of rotation (axis line X) of the movable plate 21D satisfy the relationship of a≤b, and other two portions (removed portions 252D and 254D) which are positioned at the other side (right side in FIG. 14) with respect to the center axis of rotation (axis line X) of the movable plate 21D satisfy the relationship of b≤a. Thereby, even though the movable plate 21D has a shape which is asymmetric with respect to the center axis of rotation in plan view, deviation between the center of gravity of the movable plate 21D and the center axis of rotation of the movable plate 21D can be suppressed.

More specifically, a relationship of a1<b1 is satisfied when a length along the direction of the line Y of the removed portion 251D is a1 and a length along the direction of the axis line X of the removed portion 251D is b1. That is, the removed portion 251D is formed in a rectangle in which the length in the direction of the axis line X is longer than the length in the direction of the line Y. Thereby, mass in a distal end from the axis line X of the movable plate 21D can be effectively decreased. Therefore, it is possible to effectively suppress the moment of inertia at the time of the rotation of the movable plate 21D.

On the other hand, a relationship of a2>b2 is satisfied when a length in the direction of the line Y of the removed portion 252D is a2 and a length in the direction of the axis line X of the removed portion 252D is b2. Thereby, even when area in plan view of the removed portion 252D is greater than area in plan view of the removed portion 251D, it is possible to prevent or suppress the center of gravity of the movable plate 21D from being deviated from the axis line X. Therefore, the rotation of the movable plate 21D can be smoothly performed. Moreover, in the fourth embodiment, a relationship of a1×b1<a2×b2 is satisfied.

In addition, even in the movable plate 21D, the equations (A) and (B) each are satisfied when a length in the direction of the line Y in plan view of the movable plate 21D is A, a length in the direction of the axis line X of the movable plate 21D is B, the lengths in the direction of the line Y of each of the removed portions 251D to 254D are a, and the lengths in the direction of the axis line X of each of the removed portions 251D to 254D are b.

Also according to the optical scanner of the above-described fourth embodiment, it is possible to decrease the moment of inertia at the time of the rotation of the movable plate while securing the light reflection region, and dimensional accuracy of the movable plate can be simply improved.

For example, the optical scanners described above can be appropriately applied to an image forming apparatus such as a projector, a laser printer, a display for imaging, a bar code reader, or a scanning confocal microscope. As a result, an image forming apparatus including improved drawing characteristics can be provided.

Image Forming Apparatus

Here, an example of an image forming apparatus of the invention will be described with reference to FIG. 15.

Figure 15:
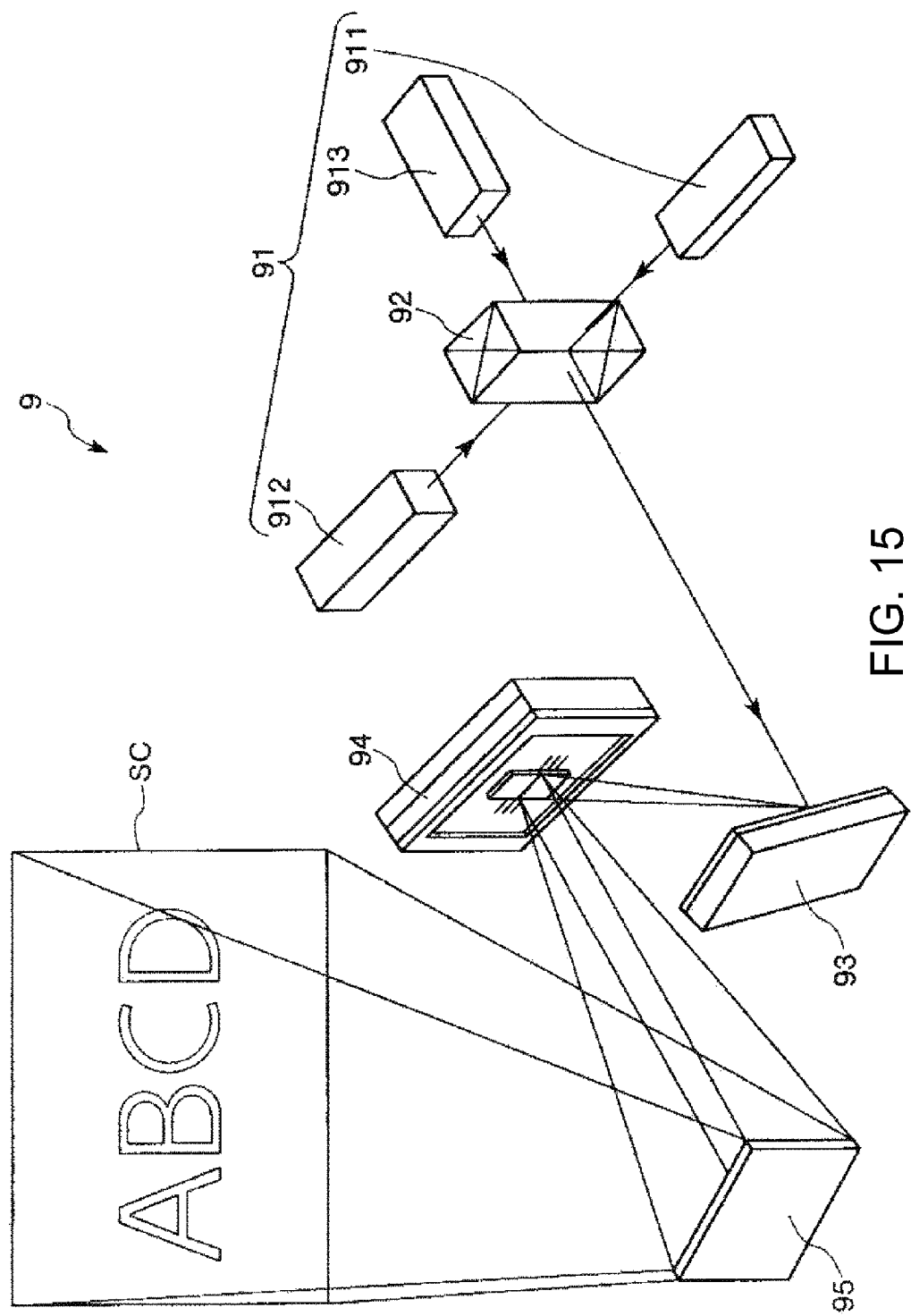
FIG. 15 is a schematic view showing an example of a configuration of an image forming apparatus of the invention.

FIG. 15 is a schematic view showing an example of a configuration of the image forming apparatus of the invention. Moreover, for convenience of the description in the following, a longitudinal direction of a screen SC is referred to as a "longitudinal direction" and a direction perpendicular to the longitudinal direction is referred to as a "vertical direction".

A projector 9 includes a light source device 91 which emits light such as a laser, a cross dichroic prism 92, a pair of optical scanners 93 and 94 according to the invention (for example, an optical scanner having the configuration similar to that of the optical scanner 1), and a fixed mirror 95.

The light source device 91 includes a red light source device 911 which emits red light, a blue light source device 912 which emits blue light, and a green light source device 913 which emits green light.

The cross dichroic prism 92 is configured by bonding four rectangular prisms and is an optical device which combines light emitted from each of the red light source device 911, the blue light source device 912, and the green light source device 913.

In the projector 9, the cross dichroic prism 92 combines the light, which is emitted from each of the red light source device 911, the blue light source device 912, and the green light source device 913, based on image information from a host computer (not shown), the combined light is scanned by the optical scanners 93 and 94, the scanned light is reflected by the fixed mirror 95, and a color image is formed on the screen SC.

Here, a light scanning of the optical scanners 93 and 94 will be specifically described.

First, the light combined by the cross dichroic prism 92 is horizontally scanned by the optical scanner 93 (main scanning). Moreover, the light which is horizontally scanned is vertically scanned by the optical scanner 94 (sub scanning). Thereby, a two-dimensional color image can be formed on the screen SC. Since the optical scanner according to the invention is used as the optical scanners 93 and 94, it is possible to exert very improved drawing characteristics.

However, the projector 9 is not limited to the above-described if being configured so as to scan light by the optical scanner and to form an image on an object. For example, the fixed mirror 95 may be omitted.

According to the projector 9 which is configured as described above, since the projector includes the optical scanners 93 and 94 including the configurations similar to those of the above-described optical scanner 1, a high quality image can be inexpensively obtained.

As described above, the actuator, the optical scanner, and the image forming apparatus according to the invention are described with reference to the shown embodiments. However, the invention is not limited thereto. For example, in the actuator, the optical scanner, and the image forming apparatus according to the invention, the configuration of each portion may be replaced with any configuration which exerts the same function, and any configuration may be added.

In addition, in the embodiments described above, the case where the movable plate is formed in a shape which is symmetrical with respect to at least one of the center axis of rotation and the line perpendicular to the center axis in plan view is described, the invention is not limited thereto. For example, the movable plate may be formed in a shape which is asymmetrical with respect to both of the center axis of rotation and the line perpendicular to the center axis in plan view.

Moreover, in the above-described embodiments, the case where the actuator according to the invention is applied to the optical scanner is described as the example. However, the actuator according to the invention is not limited to this, and for example, the actuator may be also applied to optical devices such as an optical switch and an optical attenuator. Moreover, in the above-described embodiments, the configuration in which the driving portion which rotates the movable plate adopts the moving magnet type electromagnetic drive system is described as the example. However, the driving portion may adopt a moving coil type electromagnetic drive system. In addition, the driving portion may adopt a driving system such as an electrostatic drive system and a piezoelectric drive system other than the electromagnetic drive system.

The entire disclosure of Japanese Patent Application No. 2011-084841, filed Apr. 6, 2011, is expressly incorporated by reference herein.

What is claimed is:

1. An actuator comprising:
  a movable portion which can swing around a swing axis;
  a connecting portion which extends from the movable portion and is torsionally deformed according to the swing of the movable portion; and
  a support portion which supports the connecting portion,
  wherein the movable portion is formed in a cross shape which includes a pair of first protrusions protruding to both sides of the movable portion along a direction perpendicular to the swing axis and a pair of second protrusions protruding to both sides of the movable portion along a direction parallel to the swing axis in plan view in a thickness direction of the movable portion, and
  when a length of the movable portion in the direction perpendicular to the swing axis is A, a length of the movable portion in the direction parallel to the swing axis is B, a length of the first protrusion in the direction perpendicular to the swing axis is a, and a length of the second protrusion in the direction parallel to the swing axis is b, the following equations (A) and (B) are satisfied $$0.8 \times \left\{ \frac{1}{2}\left(A - \sqrt{\frac{1}{\frac{3}{A^2}+\frac{1}{B^2}}}\right) \right\} \le a \le 2.0 \times \left\{ \frac{1}{2}\left(A - \sqrt{\frac{1}{\frac{1}{3A^2}+\frac{1}{B^2}}}\right) \right\} \quad (A)$$

$$0.8 \times \left\{ \frac{1}{2}\left(B - \sqrt{\frac{1}{\frac{1}{3A^2}+\frac{1}{B^2}}}\right) \right\} \le b \le 2.0 \times \left\{ \frac{1}{2}\left(B - \sqrt{\frac{1}{\frac{3}{A^2}+\frac{1}{B^2}}}\right) \right\}. \quad (B)$$

2. The actuator according to claim 1,
  wherein the movable portion satisfies a relationship of a≤b.
3. The actuator according to claim 1,
  wherein the following equations (C) and (D) are satisfied $$0.9 \times \left\{ \frac{1}{2}\left(A - \sqrt{\frac{1}{\frac{3}{A^2}+\frac{1}{B^2}}}\right) \right\} \le a \le 1.6 \times \left\{ \frac{1}{2}\left(A - \sqrt{\frac{1}{\frac{1}{3A^2}+\frac{1}{B^2}}}\right) \right\} \quad (C)$$

$$0.9 \times \left\{ \frac{1}{2}\left(B - \sqrt{\frac{1}{\frac{1}{3A^2}+\frac{1}{B^2}}}\right) \right\} \le b \le 1.6 \times \left\{ \frac{1}{2}\left(B - \sqrt{\frac{1}{\frac{3}{A^2}+\frac{1}{B^2}}}\right) \right\}. \quad (D)$$

4. The actuator according to claim 1,
  wherein an outer shape of the movable portion in plan view is mainly configured of a line parallel to the swing axis of the movable portion and a line perpendicular to the swing axis of the movable portion.
5. The actuator according to claim 1,
  wherein the movable portion, the support portion, and the connecting portion are formed by anisotropically etching a silicon substrate.
6. The actuator according to claim 5,
  wherein a plate surface of the movable portion is configured of a (100) plane of silicon.
7. The actuator according to claim 5,
  wherein side surfaces of the movable portion are mainly configured of a (111) plane of silicon.
8. The actuator according to claim 7,
  wherein a groove having a V shape in a cross-section perpendicular to a plate surface of the movable portion is formed in the side surfaces of the movable portion.
9. The actuator according to claim 5,
  wherein a surface of the connecting portion is configured of a (100) plane and a (111) plane of silicon.
10. An actuator comprising:
  a movable portion which can swing around a swing axis,
  a connecting portion which extends from the movable portion and is torsionally deformed according to the swing of the movable portion, and
  a support portion which supports the connecting portion,
  wherein the movable portion is formed in a shape in which each of four corner-portions of a quadrangle including a pair of sides along the swing axis and a pair of sides along a direction perpendicular to the swing axis is removed in a quadrilateral shape in plan view in a thickness direction of the movable portion, and
  when a length of the movable portion in the direction perpendicular to the swing axis is A, a length of the movable portion in the direction parallel to the swing axis is B, a length of four corner-portions of the movable portion in a direction perpendicular to the swing axis is a, and a length of four corner-portions of the movable portion in a direction parallel to the swing axis is b, the following equations (A) and (B) are satisfied $$0.8 \times \left\{ \frac{1}{2}\left(A - \sqrt{\frac{1}{\frac{3}{A^2}+\frac{1}{B^2}}}\right) \right\} \le a \le 2.0 \times \left\{ \frac{1}{2}\left(A - \sqrt{\frac{1}{\frac{1}{3A^2}+\frac{1}{B^2}}}\right) \right\} \quad (A)$$

$$0.8 \times \left\{ \frac{1}{2}\left(B - \sqrt{\frac{1}{\frac{1}{3A^2}+\frac{1}{B^2}}}\right) \right\} \le b \le 2.0 \times \left\{ \frac{1}{2}\left(B - \sqrt{\frac{1}{\frac{3}{A^2}+\frac{1}{B^2}}}\right) \right\}. \quad (B)$$

11. An optical scanner comprising:
  a movable portion which includes a light reflecting portion having light reflectivity and can swing around a swing axis, a connecting portion which extends from the movable portion and is torsionally deformed according to the swing of the movable portion, and a support portion which supports the connecting portion, wherein the movable portion is formed in a cross shape which includes a pair of first protrusions protruding to both sides of the movable portion along a direction perpendicular to the swing axis and a pair of second protrusions protruding to both sides of the movable portion along a direction parallel to the swing axis in plan view in a thickness direction of the movable portion, and when a length of the movable portion in the direction perpendicular to the swing axis is A, a length of the movable portion in the direction parallel to the swing axis is B, a length of the first protrusion in the direction perpendicular to the swing axis is a, and a length of the second protrusion in the direction parallel to the swing axis is b, the following equations (A) and (B) are satisfied $$0.8 \times \left\{ \frac{1}{2}\left(A - \sqrt{\frac{1}{\frac{3}{A^2} + \frac{1}{B^2}}}\right) \right\} \leq a \leq 2.0 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \leq b \leq 2.0 \times \left\{ \frac{1}{2}\left(B - \sqrt{\frac{1}{\frac{3}{A^2} + \frac{1}{B^2}}}\right) \right\}. \quad (B)$$

12. The optical scanner according to claim 11,
wherein the movable portion satisfies a relationship of a≤b.

13. The optical scanner according to claim 11,
wherein the following equations (C) and (D) are satisfied $$0.9 \times \left\{ \frac{1}{2}\left(A - \sqrt{\frac{1}{\frac{3}{A^2} + \frac{1}{B^2}}}\right) \right\} \leq a \leq 1.6 \times \left\{ \frac{1}{2}\left(A - \sqrt{\frac{1}{\frac{1}{3A^2} + \frac{1}{B^2}}}\right) \right\} \quad (C)$$

$$0.9 \times \left\{ \frac{1}{2}\left(B - \sqrt{\frac{1}{\frac{1}{3A^2} + \frac{1}{B^2}}}\right) \right\} \leq b \leq 1.6 \times \left\{ \frac{1}{2}\left(B - \sqrt{\frac{1}{\frac{3}{A^2} + \frac{1}{B^2}}}\right) \right\}. \quad (D)$$

14. The optical scanner according to claim 11,
wherein an outer shape of the movable portion in plan view is mainly configured of a line parallel to the swing axis of the movable portion and a line perpendicular to the swing axis of the movable portion.

15. The optical scanner according to claim 11,
wherein the movable portion, the support portion, and the connecting portion are formed by anisotropically etching a silicon substrate.

16. The optical scanner according to claim 15,
wherein a plate surface of the movable portion is configured of a (100) plane of silicon.

17. The optical scanner according to claim 15,
wherein side surfaces of the movable portion are mainly configured of a (111) plane of silicon.

18. The optical scanner according to claim 17,
wherein a groove having a V shape in a cross-section perpendicular to a plate surface of the movable portion is formed in the side surfaces of the movable portion.

19. The optical scanner according to claim 15,
wherein a surface of the connecting portion is configured of a (100) plane and a (111) plane of silicon.

* * * * *